United States Patent
Takano

(10) Patent No.: US 9,001,793 B2
(45) Date of Patent: Apr. 7, 2015

(54) COMMUNICATION SYSTEM, COMMUNICATION APPARATUS, COMMUNICATION METHOD AND COMPUTER PROGRAM PRODUCT

(75) Inventor: Hiroaki Takano, Saitama (JP)

(73) Assignee: Sony Corporation, Tokyo (JP)

( * ) Notice: Subject to any disclaimer, the term of this patent is extended or adjusted under 35 U.S.C. 154(b) by 288 days.

(21) Appl. No.: 13/390,612

(22) PCT Filed: Aug. 10, 2010

(86) PCT No.: PCT/JP2010/005022
§ 371 (c)(1),
(2), (4) Date: Mar. 26, 2012

(87) PCT Pub. No.: WO2011/024400
PCT Pub. Date: Mar. 3, 2011

(65) Prior Publication Data
US 2012/0176927 A1 Jul. 12, 2012

(30) Foreign Application Priority Data

Aug. 26, 2009 (JP) ................................. 2009-195919
Jul. 1, 2010 (JP) ................................. 2010-151416

(51) Int. Cl.
*H04W 4/00* (2009.01)
*H04W 72/12* (2009.01)
(Continued)

(52) U.S. Cl.
CPC ....... *H04W 72/1278* (2013.01); *H04B 7/15507* (2013.01); *H04B 7/15542* (2013.01); *H04J 11/0053* (2013.01); *H04W 72/1226* (2013.01); *H04W 84/047* (2013.01)

(58) Field of Classification Search
USPC .......................... 370/329, 330, 331, 332, 341
See application file for complete search history.

(56) References Cited

U.S. PATENT DOCUMENTS 5,790,528 A * 8/1998 Muszynski .................... 370/331
5,850,607 A * 12/1998 Muszynski .................... 455/442
(Continued)

FOREIGN PATENT DOCUMENTS

| JP | 09 312869 | 12/1997 |
|---|---|---|
| JP | 2006 074468 | 3/2006 |

(Continued)

OTHER PUBLICATIONS

3GPP TSG-RAN WG2 meeting # 66, R2-093107, "RAN2 considerations for coordinated multipoint transmission and reception", Huawei, May 4, 2009.

(Continued)

*Primary Examiner* — Zewdu A Beyen
(74) *Attorney, Agent, or Firm* — Oblon, McClelland, Maier & Neustadt, L.L.P.

(57) ABSTRACT

A relay node (or relay station) assists in providing asymmetric communications with a mobile station. When resources are less than ideal for providing a direct uplink or downlink with the mobile station to a first base station, the relay station is employed to provide an uplink or downlink to a second base station. The mobile station may still maintain a direct downlink/uplink to the first base station when adequate resources are present. To assist in resource coordination the first and second base stations share scheduling information for the mobile station. This approach allows a second base station to server as a surrogate base station for a first base station, when inadequate resources are available for a direct uplink or downlink to the mobile station. The relay node makes it possible for the mobile station to maintain the uplink (or downlink) with the second base station, while remaining assigned to the first base station.

20 Claims, 21 Drawing Sheets

(51) Int. Cl.
*H04B 7/155* (2006.01)
*H04J 11/00* (2006.01)
*H04W 84/04* (2009.01)

(56) References Cited

U.S. PATENT DOCUMENTS

| | | | |
|---|---|---|---|
| 7,477,695 B2 | 1/2009 | Takano | |
| 7,620,114 B2 | 11/2009 | Takano | |
| 7,627,045 B2 | 12/2009 | Takano | |
| 7,680,461 B2 | 3/2010 | Takano | |
| 8,000,421 B2 | 8/2011 | Takano et al. | |
| 2005/0141631 A1 | 6/2005 | Takano | |
| 2006/0052105 A1* | 3/2006 | Yeh | 455/436 |
| 2007/0263575 A1* | 11/2007 | Choe | 370/338 |
| 2008/0080469 A1* | 4/2008 | Kolding et al. | 370/342 |
| 2008/0192699 A1* | 8/2008 | Rue | 370/331 |
| 2010/0056157 A1* | 3/2010 | Verona et al. | 455/438 |
| 2010/0085884 A1* | 4/2010 | Srinivasan et al. | 370/252 |
| 2010/0317364 A1* | 12/2010 | Zhang et al. | 455/452.2 |
| 2012/0052796 A1 | 3/2012 | Takano | |
| 2012/0176927 A1 | 7/2012 | Takano | |

FOREIGN PATENT DOCUMENTS

| | | |
|---|---|---|
| JP | 2008 22558 | 1/2008 |
| JP | 2008 523647 | 7/2008 |

OTHER PUBLICATIONS

3GPP TSG RAN1 #57b R1-092592, "Consideration on Cell Selection in CoMP network including Relay Nodes.", Pantech & Curitel, Jun. 29, 2009.

International Search Report issued on Sep. 7, 2010 in PCT/JP10/005022 filed on Aug. 10, 2010.

U.S. Appl. No. 13/377,718, filed Dec. 12, 2011, Takano.
U.S. Appl. No. 13/389,617, filed Feb. 9, 2011, Takano.
U.S. Appl. No. 14/482,672, filed Sep. 10, 2014, Takano.

* cited by examiner

[Fig. 4C]

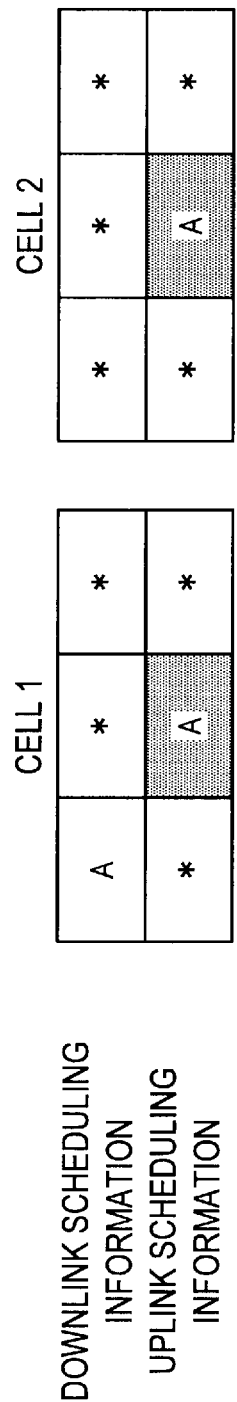

FIG.11
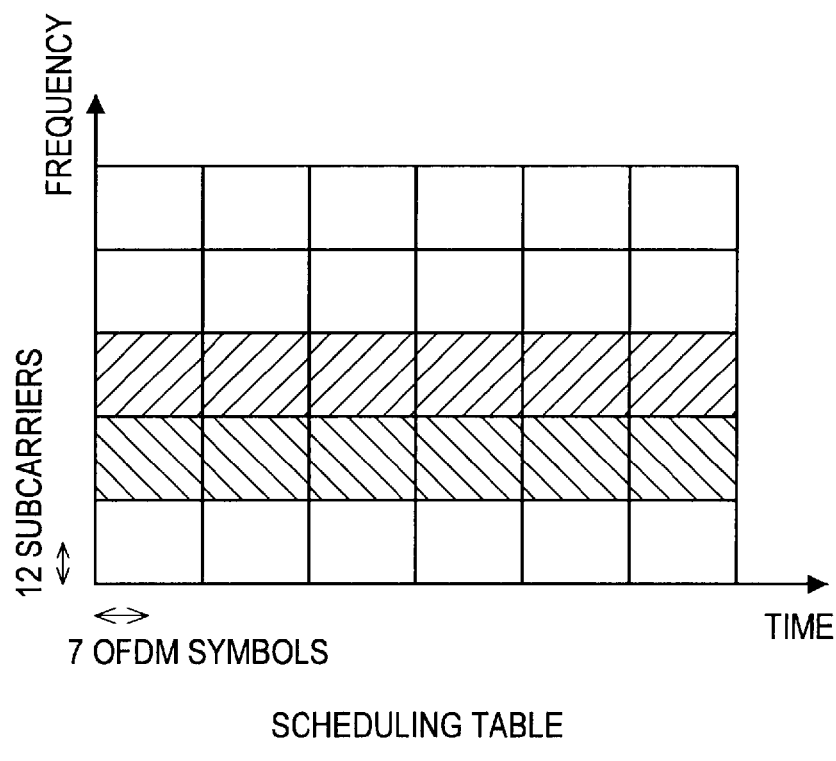
SCHEDULING TABLE
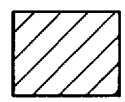 : FIRST COMMON SCHEDULING REGION
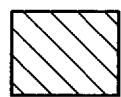 : SECOND COMMON SCHEDULING REGION FIG.12
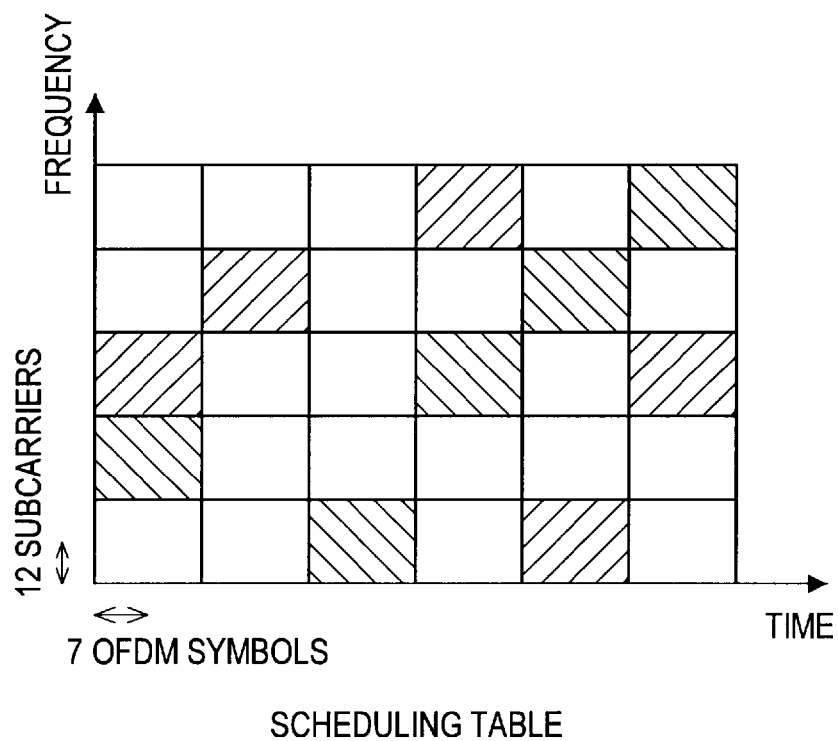
SCHEDULING TABLE
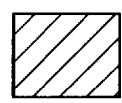 : FIRST COMMON SCHEDULING REGION
 : SECOND COMMON SCHEDULING REGION

COMMUNICATION SYSTEM, COMMUNICATION APPARATUS, COMMUNICATION METHOD AND COMPUTER PROGRAM PRODUCT

TECHNICAL FIELD

The present invention relates to a communication system, a communication apparatus, a communication method and a computer program product in which a base station communicates with a mobile station within a cell through the mediation of a relay station. In particular, the present invention relates to a communication system, a communication apparatus, a communication method and a computer program product which employ a relay mode that applies intercell interference coordination.

BACKGROUND ART

Communication services become increasingly diverse with widespread use of information processing and information communication technology and in particular, development of mobile communication such as mobile phone is remarkable. Currently, 3GPP (Third Generation Partnership Project) is working on standardization of the world standard "IMT (International Mobile Telecommunications)—2000" of a third-generation (3G) mobile communication system drafted by ITU (International Telecommunication Union). "LTE (Long Term Evolution)", which is one of data communication specifications drafted by 3GPP, is a long-term advanced system aimed at fourth-generation (4G) IMT-Advanced and is also called "3.9G (super 3G)".

LTE is a communication mode based on an OFDM (Orthogonal Frequency Division Multiplexing) modulation method and adopts OFDMA (OFDM access) as the radio access method of a downlink. OFDM is a multi-carrier method by which a plurality of pieces of data is assigned to frequency sub-carriers that are "orthogonal", that is, do not interfere with each other and can convert each sub-carrier on a frequency axis into a signal on a time axis for transmission by performing inverse FFT (Fast Fourier Transform) for each sub-carrier. Transmission data is transmitted by being distributed to a plurality of carriers whose frequencies are orthogonal and thus, OFDM is characterized in that the band of each carrier becomes a narrow band, the efficiency of frequency utilization is very high, and delay distortion (frequency selective fading disturbance) is resisted thanks to multi paths. OFDMA is a multiple access scheme in which, instead of all sub-carriers of an OFDM signal being occupied by one communicating station, a set of sub-carriers in the frequency axis is assigned to a plurality of communicating stations so that sub-carriers are shared by the plurality of communicating stations. If a plurality of users each use different sub-carriers or different time slots (that is, division multiplexing in a frequency direction and a time direction), communication can be performed without interference.

3GPP supports a bandwidth close to 100 MHz in a standard specification "LTE-Advanced", which is a further development of LTE for a fourth-generation mobile communication system, and aims for realization of the peak speed of 1 Gbps at the maximum. A space division multiple access scheme in which radio resources on spatial axes are shared by a plurality of users like, for example, multi-user MIMO (MU-MIMO) or SDMA (Space Division Multiple Access) is regarded as very likely.

Moreover, relay technology is examined for LTE-Advanced to improve throughput at cell edges. The relay technology here is a mechanism by which a relay station (RS) is installed in an area (cell) of a base station connected to a core network to allow hopping communication between the base station and the relay station. If the communication speed is 1-2 Mbps or so, the modulation method such as BPSK (Binary Phase Shift Keying) and QPSK (Quadrature PSK) can be applied and a necessary SNR (Signal-to-Noise Ratio) is permitted even if the SNR is low at cell edges. In contrast, to obtain the communication speed of 100 Mbps or more, it is necessary to maintain a high SNR throughout the cell. Moreover, a higher operating frequency increases transmission losses and is sensitive to fading so that a coverage area of a base station deteriorates. Performance of a single base station falls at cell edges and a relay station compensates therefor.

In a downlink, a relay station amplifies a received signal from a base station and then transmits the received signal to a mobile station. With a signal being relayed, the SNR can be made larger when compared with a case when the signal is directly transmitted from the base station to the mobile station. In an uplink, on the other hand, the relay station can maintain the SNR high by receiving a signal from the mobile station and transmitting the signal to the base station (downbound radio access from a base station (BS) toward a mobile station (MS) is called herein as a "downlink" and up-bound radio access from the MS to the BS as an "uplink").

For example, a cellular system in which a base station assigns resources to terminals, transmits a downlink signal in the current time slot, and receives an uplink signal from terminals via a relay station in the next time slot, the relay station receives a downlink signal from the base station and an uplink signal from terminals in the current time slot and transmits the received downlink signal to the terminals and the received uplink signal to the base station in the next time slot, and the terminal transmits an uplink signal in the current time slot and receives a downlink signal via the relay station in the next time slot (see, for example, Japanese Patent Application Laid-Open No. 2008-22558).

The mode in which a relay station relays a signal between a base station and a mobile station can be classified into the following two types based on how a received signal is transmitted.

The first type is a mode called "Amplify-and-Forward (AF)" in which a relay station retransmits a received signal from a base station after amplifying the signal unchanged as an analog signal. In the AF mode, it is difficult for the mobile station to improve the SNR and thus, it is necessary for the relay station to relay by using a region in which signal strength is sufficiently large. Moreover, there is a feedback path between a transmitting antenna and a receiving antenna so that consideration must be given to prevention of oscillation. An advantage of the AF mode is that there is no need at all to improve the communication protocol.

The second type is a mode called "Decode-and-Forward (DF)" in which the relay station performs digital processing on a received signal from the base station and then amplifies and transmits the received signal. That is, the relay station converts the received signal from the base station into a digital signal by the AD conversion, performs decode processing such as an error correction on the signal, encodes the signal again, and converts the signal into an analog signal by the DA conversion before amplifying and transmitting the signal. According to the DF mode, the SNR can be improved by a coding gain. Further, an issue of a signal turnaround into between the transmitting antenna and the receiving antenna can be avoided by a signal converted into a digital signal being stored in a memory and the signal being transmitted in the next time slot by the relay station. Oscillation can also be suppressed by changing the frequency, instead of the time slot being changed for transmission and reception.

In LTE-Advanced, which is a future network of 3GPP, the DF mode capable of improving the SNR rather than the AF mode is more likely to be used.

In LTE, intercell interference coordination (ICIC) is proposed to reduce an influence of interference between adjacent cells of the same channel.

The ICIC can be realized by, for example, a fractional frequency repetition combining a one-cell frequency repetition and a multi-cell frequency repetition. Each cell is divided into a center region inside the cell close to a base station and a boundary region at cell ends apart from the base station. While a "central frequency" assigned to communication between the base station and the mobile station in the center region competes with that of adjacent cells (that is, a one-cell frequency repetition), interference between cells is avoided by controlling transmission power small enough so that a signal reaches only within the center region. On the other hand, it is necessary to transmit a signal large enough so that the signal reaches the boundary region and interference between cells is avoided by mutually different "boundary frequencies" being used by boundary regions of adjacent cells (that is, a multi-cell frequency repetition).

Moreover, instead of all sub-carriers of an OFDM signal being occupied by one mobile station, sub-carriers of the central frequency are assigned to mobile stations near the base station and those of boundary frequencies to mobile stations apart from the base station so that sub-carriers are shared by a plurality of mobile stations to implement multiple access (OFDMA).

Thus if a plurality of users respectively use different sub-carriers or different time slots, communication can be performed without interference. The base station consolidates control of radio resources in a cell. In LTE, a resource block is composed of 12 subcarriers multiplied by 7 OFDM symbols, and radio resources are assigned in resource blocks (described later).

In LTE, two duplex systems, FDD (Frequency Division Duplex) and TDD (Time Division Duplex), can be selected. In the case of TDD, which of an uplink and a downlink to use can be selected for each subframe.

A case in which vacancy states of radio resources in one cell are asymmetric with respect to a downlink and an uplink can be assumed. (For example, while there are vacant resources for a downlink of the base station, there are no vacant resources for an uplink, or conversely, while there are vacant resources for an uplink in the base station, there are no vacant resources for a downlink.) For example, in a cell which has many users to upload a movie image or the like to the server using the uplink, the vacant resources for the uplink are less than the vacant resources for the downlink. On the contrary, in a cell which has many users to download a large amount of images, it is considered that only resources for a downlink will be in short supply. Thus, imbalance in users and imbalance in applications employed by users cause asymmetry (that is a ratio of vacant resources for the uplink and downlink is the metric for asymmetry in each cell). As recognized by the present inventors, asymmetry of radio resources between a downlink and an uplink causes deterioration in efficiency of frequency utilization, which may result in deterioration in throughput for the user.

CITATION LIST

Patent Literature

PTL 1: Japanese Patent Application Laid-Open No. 2008-22558

SUMMARY OF INVENTION

Technical Problem

Thus, it is desirable to provide a communication system, a communication apparatus, a communication method and a computer program product which are superior, and in which a base station can suitably communicate with a mobile station in a cell through the mediation of a relay station.

It is also desirable to provide a communication system, a communication apparatus, a communication method and a computer program product which employ a superior relay mode capable of suitably performing intercell interference coordination.

It is also desirable to provide a superior communication system, a communication apparatus, a communication method and a computer program product which are capable of eliminating asymmetry of radio resources assigned to a downlink and an uplink of a mobile station in a cell to improve efficiency of frequency utilization as well as throughput for the user.

Solution to Problem

One non-limiting approach to addressing the above-identified and other problems involves a mobile communication system that includes
a first base station that services a first coverage area;
a second base station that services a second coverage area;
a first relay node disposed in the first coverage area; and
a relay mode decision unit configured to determine if a communications quality of a link between the mobile station and the first base station through the first relay node is below a predetermined level, and when the communications quality is below the predetermined level, switch one of an uplink and a downlink from the first base station to the second base station while maintaining the other of the uplink and downlink with the first base station.

One aspect of the system is that a first coverage area includes
an inner region where the wireless resources are dedicated for use by the first base station, and
an outer region where the wireless resources are shared by the first base station and the second base station.

The relay mode decision unit may disposed in one of the first base station and the first relay node.

Also, the switch may be implemented by using Coordination Multiple Point transmission and reception (CoMP).

In the system, the predetermined level is adjusted by the relay mode decision unit to account for link communications quality with the second base station, but does not switch to the second base station when the link communications quality is lower than that for the first base station.

The scheduling of wireless resources includes intercell interference coordination using fractional frequency repetition that combines one-cell frequency repetition and multi-cell frequency repetition.

Another aspect is that at least one of signal strength, GPS reception and signal delay are used to determine a relative location of the mobile station, and the first base station and the second base station coordinate scheduling of wireless resources for a mobile station located in the first coverage area.

Another embodiment may be a mobile station for use in a wireless communications system having a first base station that services a first coverage area, a second base station that services a second coverage area, and a first relay node disposed in the first coverage area, the mobile station including a controller;

a scheduling information storage device that is accessible to the controller and contains information describing a scheduling table indicating wireless resources to use for a link through the first relay node to the first base station; and a transmitter, wherein the controller is configured to receive an indication from one of the first base station and the first relay node when the mobile station is in the first coverage area that the mobile station is to switch one of an uplink and a downlink from the first base station to the second base station when communications quality with the first base station is below a predetermined level.

Regarding the mobile station, the first coverage area includes an inner region where the wireless resources are dedicated for use by the first base station, and an outer region where the wireless resources are shared between the first base station and the second base station, wherein the mobile station includes a GPS receiver that informs the first base station of a position of the mobile station.

The first base station and the first relay node include a relay mode decision unit that informs the mobile station when to switch communications to the second base station.

The switch may be implemented by using Coordination Multiple Point transmission and reception (CoMP).

The controller does not switch to the second base station when communication quality with the second base station is inferior to a communication quality with the first base station via the first relay node.

The information in the scheduling information storage device includes scheduling based on fractional frequency repetition that combines one-cell frequency repetition and multi-cell frequency repetition.

Another embodiment is directed to a base station for a wireless mobile communication system, including a transmitter that provides wireless coverage over a first coverage area, the first coverage area including a first relay node and a mobile station, the first coverage area abutting a second coverage area provided by a second base station; and a relay mode decision unit configured to determine if a quality of a link between the mobile station and the first base station through the first relay node is below a predetermined level, and when the quality is below the predetermined level, inform the mobile station to switch to one of an uplink and a downlink with the second base station while maintaining the other of the uplink and downlink with the first base station.

The first coverage area includes an inner region where the wireless resources are dedicated for use by the first base station, and an outer region where the wireless resources are shared between the first base station and the second base station.

The relay mode decision unit makes the switch by using Coordination Multiple Point transmission and reception (CoMP).

The predetermined level is adjusted by the relay mode decision unit to account for link communications quality between the mobile station and the second base station, but does not switch to the second base station when the link communications quality is lower than for the base station.

At least one of signal strength, GPS reception and signal delay are used to determine a relative location of the mobile station, and a scheduler configured to coordinate scheduling of wireless resources for the mobile station in the first coverage area with the second base station.

Another embodiment is directed to a method for conducting wireless communications in a mobile communication system, including establishing a link from a mobile station to a first base station via a relay node, the relay node and the mobile station being located in a first coverage that is serviced by the first base station;

determining by a relay mode decision unit that a quality of the link is below a predetermined threshold and requesting that the mobile station establish another link with a second base station when the determining step determines that the quality of the link is below the predetermined threshold; and continuing to provide one of an uplink and a downlink between the first base station and the mobile station while the mobile station communicates via the other of the uplink and downlink with the second base station.

The continuing step may include using Coordination Multiple Point transmission and reception (CoMP) to coordinate establishing the other of the uplink and downlink with the second base station.

BRIEF DESCRIPTION OF DRAWINGS

FIG. 7 is a diagram showing a situation in which scheduling information of an uplink is matched between adjacent cells that establish the uplink from a mobile station by the asymmetric relay.

FIG. 11 is a diagram showing a setting example of a common scheduling region in which positions in a frequency direction do not change over time.

FIG. 12 is a diagram showing how frequency hopping is allowed for the common scheduling region over time.

DESCRIPTION OF EMBODIMENTS

An embodiment in which the present invention is applied to a mobile communication system such as LTE will be described in detail with reference to the drawings.

Figure 1:
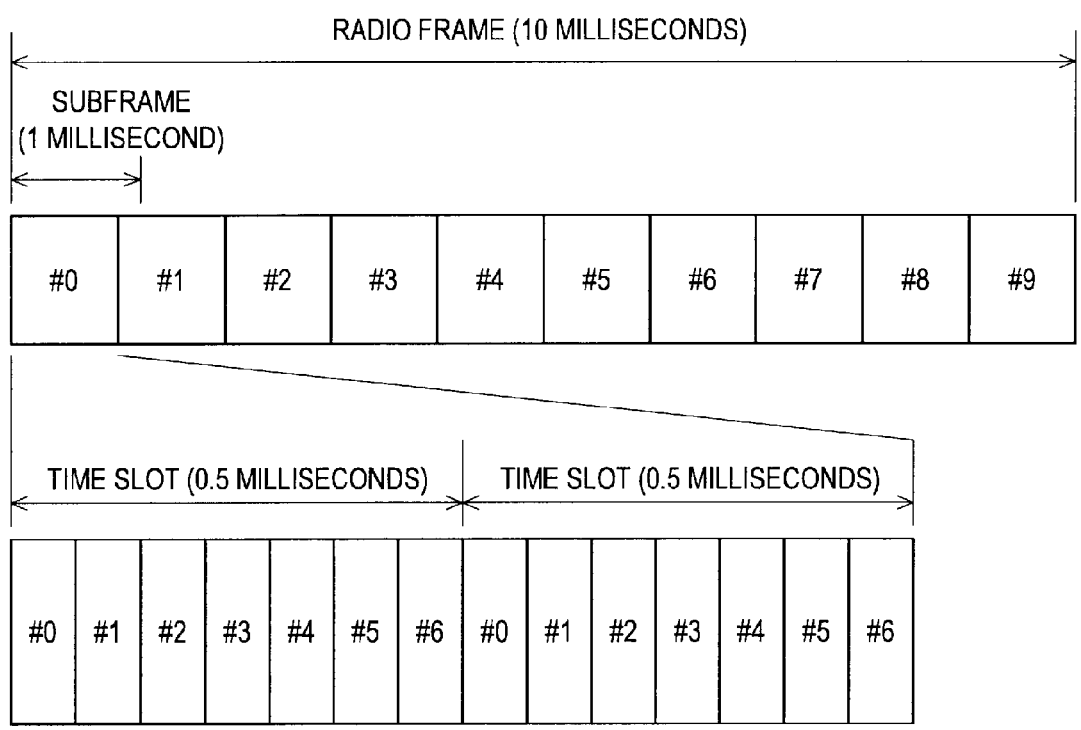
FIG. 1 is a diagram showing a radio frame configuration of a downlink of LTE.

FIG. 1 shows a radio frame configuration of a downlink of LTE. As illustrated in FIG. 1, a radio frame is composed of three hierarchical layers of a time slot (Slot), a subframe (Subframe), and a radio frame (Radio Frame) in descending order of time unit.

A time slot of 0.5 millisecond is constituted by seven OFDM symbols (for normal unicast transmission) and becomes the unit of decode processing when received by a user (mobile station). A subframe of 1 millisecond is constituted by two consecutive time slots and becomes the unit of transmission time of a correction-coded data packet. A radio frame of 10 millisecond is constituted by 10 consecutive subframes (that is, 20 time slots) and becomes the basic unit for multiplexing of all physical channels.

Each user can perform communication without mutual interference by using different subcarriers or different time slots. In LTE, the minimum unit of radio resource assignment called a "resource block (RB)" is defined by dividing continuous subcarriers into blocks.

Figure 2:
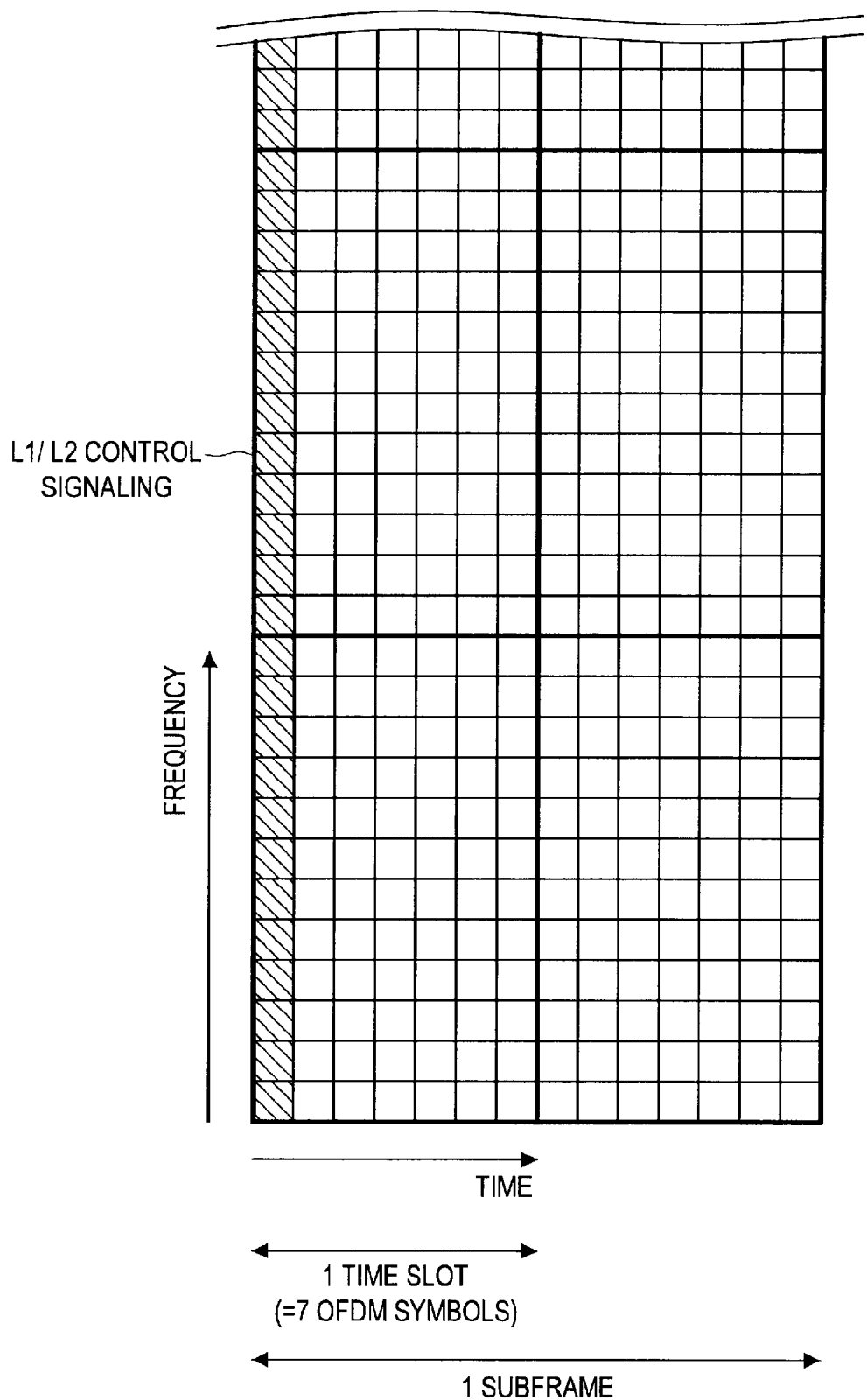
FIG. 2 is a diagram schematically showing how resource blocks are assigned.

A scheduler mounted on a base station assigns radio resources to each user in resource blocks. FIG. 2 schematically shows how resource blocks are assigned. A resource block is composed of 12 subcarriers multiplied by 1 time slot (7 OFDM symbols=0.5 millisecond), and a thick line frame corresponds to a resource block in FIG. 2. Up to 3 OFDM symbols from the head of a subframe are used as a control channel called "L1/L2 control signaling" (In the illustrated example, only the top symbol is used for the control channel). The scheduler of a base station can assign resource blocks for each subframe, that is, at intervals of 1 millisecond. Position information of resource blocks is called scheduling. Scheduling information of uplinks and that of downlinks are both written into a control channel downlinks. Each user can recognize resource blocks assigned to the user by viewing the control channel.

In LTE, two duplex systems, FDD (Frequency Division Duplex) and TDD (Time Division Duplex), can be selected. In the case of TDD, which of an uplink and a downlink to use can be selected for each subframe.

In a communication system according to the present embodiment, relay technology is introduced for the purpose of improving throughput at cell edges.

Figure 3:
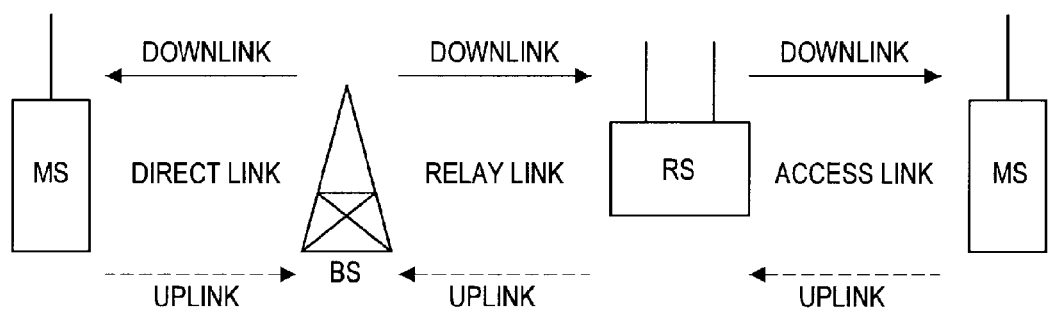
FIG. 3 is a diagram showing a basic communication operation inside a cell including cases when a relay station mediates and does not mediate.

Basic communication operations within a cell including cases when a relay station mediates and does not mediate will be described with reference to FIG. 3. A link between a base station (BS) and a relay station (RS) is called a "relay link (RelayLink)" and a link between the relay station and a mobile station (MS) is called an "access link (AccessLink)". A direct link between the base station and the mobile station without using the relay station is called a "direct link (DirectLink)". In FIG. 3, a downlink is denoted as a solid line arrow and an uplink as a broken line arrow.

In LTE, radio resources are assigned in resource blocks and specified by a control channel called the L1/L2 signaling (mentioned above). A relay station judges whether there is any resource block addressed to the relay station by viewing assignment information of resource blocks in the control channel, that is, scheduling information every 1 millisecond.

In a downlink, the relay station first amplifies a received signal from a base station by, for example, the DF mode (mentioned above) and then transmits the received signal to a mobile station. With a received signal being relayed by a relay station, the SNR can be increased when compared with a case when a signal is directly transmitted from a base station to a mobile station. In an uplink, on the other hand, the relay station can maintain the SNR high by receiving a signal from the mobile station, and transmitting the signal to the base station after amplifying the received signal.

It is assumed that a plurality of relay stations may be arranged in a cell while arranging only one base station per cell. In perspective of power saving, there is a demand to equip a function of a sleep mode in the relay stations. The relay stations in sleep mode open a receiving window only in a predetermined period of time. Thus, the relay stations stop the receiving operations unless the relay stations receive control signals transmitted from the base station in the predetermined period of time, and save the consumption power.

Further, in a communication system according to the present embodiment, the intercell interference coordination (mentioned above) is applied to reduce an influence of interference between adjacent cells of the same channel.

The intercell interference coordination will be described again here with reference to FIGS. 4A to 4D. In the illustrated example, the intercell interference coordination is realized by a fractional frequency repetition combining a one-cell frequency repetition and a multi-cell frequency repetition (3-cell frequency repetition in FIG. 4).

Figure 4A:
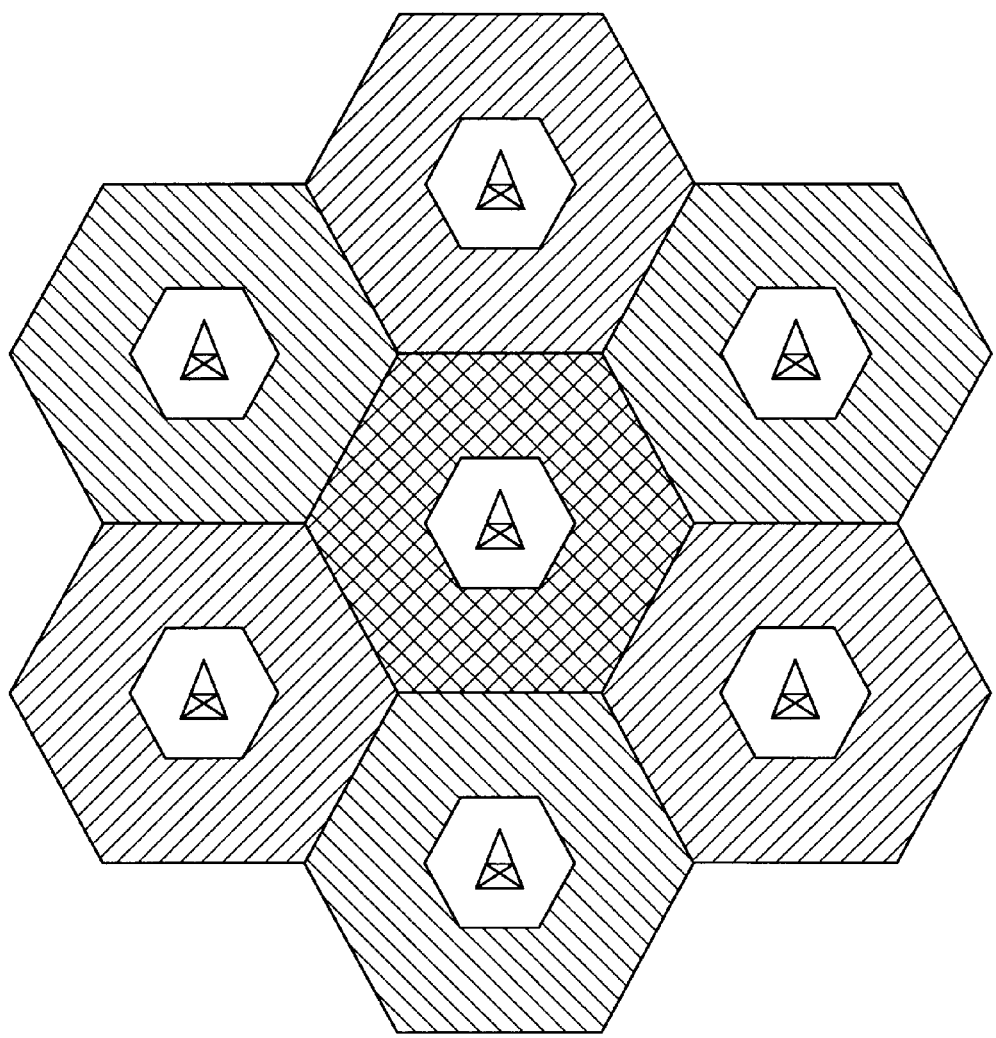
FIG. 4A is a diagram showing a cellular system realizing intercell interference coordination by a fractional frequency repetition.

In FIG. 4A, a hexagon represents one cell range. Each cell is divided into a white center region inside the cell and a shaded boundary region at cell ends. The central frequency assigned to the center region competes with that of adjacent cells (that is, the frequency repetition is 1), but interference between cells is avoided by controlling transmission power small enough so that a signal reaches only within a center region. On the other hand, different frequencies are assigned to boundary regions of adjacent cells (that is, the 3-cell frequency repetition is performed). In FIG. 4A, a difference in frequency band is represented by shading types (positive slopes, negative slopes, and grid-like slashes). By switching allocation of frequency assignment between adjacent cells as illustrated in FIGS. 4A-D, efficient frequency assignment can be operated.

Figure 4B:
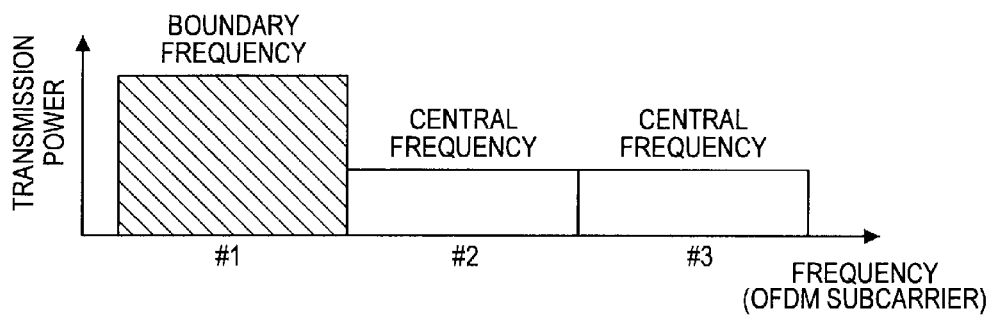
FIG. 4B is a diagram illustrating a frequency assignment inside the cell in which the fractional frequency repetition is performed.
Figure 4C:
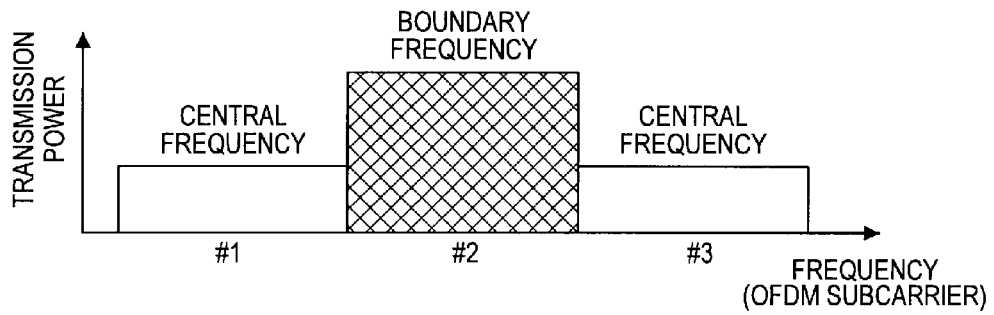
FIG. 4C is a diagram illustrating the frequency assignment inside the cell in which the fractional frequency repetition is performed.
Figure 4D:
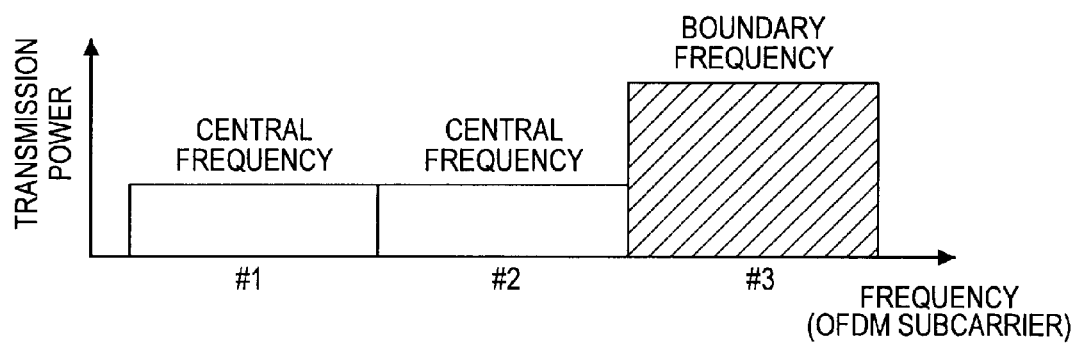
FIG. 4D is a diagram illustrating the frequency assignment inside the cell in which the fractional frequency repetition is performed.

FIGS. 4B to 4D show frequency assignment inside a cell and transmission power. In each cell, the system frequency band is divided into three subcarrier blocks and a subcarrier block used for frequency repetition between cells is assigned to the boundary frequency and a subcarrier block for 1-cell frequency repetition to the central frequency.

In a cell having a boundary region with negative slopes in FIG. 4A, for example, a subcarrier block #1 is assigned to the boundary frequency and subcarrier blocks #2 and #3 to the central frequency (see FIG. 4B). In a cell having a grid-like shaded boundary region in FIG. 4A, the subcarrier block #2 is assigned to the boundary frequency and the subcarrier blocks #1 and #3 to the central frequency (see FIG. 4C). In a cell having a boundary region with positive slopes in FIG. 4A, the subcarrier block #3 is assigned to the boundary frequency and the subcarrier blocks #1 and #2 to the central frequency (see FIG. 4D). In each cell, multiple access (OFDMA) is realized by, instead of all sub-carriers of an OFDM signal being occupied by one communicating station, assigning subcarriers of the central frequency to a mobile station or relay station in the center region and subcarriers of the boundary frequency to a mobile station or relay station in the boundary region to share subcarriers by a plurality of communicating stations.

In any cell in FIG. 4A, transmission power of the central frequency is controlled to a transmission power that is small enough so a signal reaches only within a center region of the cell. This prevents inter-cell interference even if the 1-cell frequency is repeated in an adjacent cell. While transmission power of the boundary frequency is large enough so that a radio wave reaches a cell end from the base station in the cell center, inter-cell interference does not occur because a frequency repetition of a plurality of cells (three cells in the illustrated example) is used.

The intercell interference coordination (ICIC) generally uses a frequency in the band by dividing into a central frequency and a boundary frequency. In examples illustrated in FIG. 4B, FIG. 4C, FIG. 4D, one system frequency (bandwidth of 20 MHz in LTE) is divided into three sub-carrier blocks, and each sub-carrier block is assigned to a central frequency or a boundary frequency to be used. On the other hand, a method to bind a plurality of bands to communicate may be considered. For example, in case of a communication using carrier aggregation that communicates in a bandwidth of binding five system frequencies of 20 MHz in each bandwidth, 20 MHz multiplies by 5=100 MHz, the frequency assignment for the central frequency and the boundary frequency in the intercell interference coordination may be performed in a bandwidth of 20 MHz.

Sometimes vacancy states of radio resources (e.g., wireless resources such as assignable frequencies) in one cell are asymmetric with respect to a downlink and an uplink. For example, while there are vacant wireless resources for a downlink of the base station, there are no (or few) vacant resources for an uplink, or conversely, while there are vacant resources for an uplink, there are no (or few) vacant resources for a downlink. A cause of this asymmetry may be due to relay stations operating in a sleep mode in which they only awaken for reception during a receiving window at a predetermined time period. The imbalance in users and imbalance in applications employed by users may also cause asymmetry (as described above). Asymmetry of radio resources between a downlink and an uplink causes deterioration in efficiency of frequency utilization, which may result in deterioration in throughput for the user.

Thus, in a communication system according to the present embodiment, asymmetry of radio resources assigned to a downlink and an uplink in a cell is eliminated by performing an asymmetric relay in which an uplink and a downlink are connected via the relay station in a different cell.

Figure 5A:
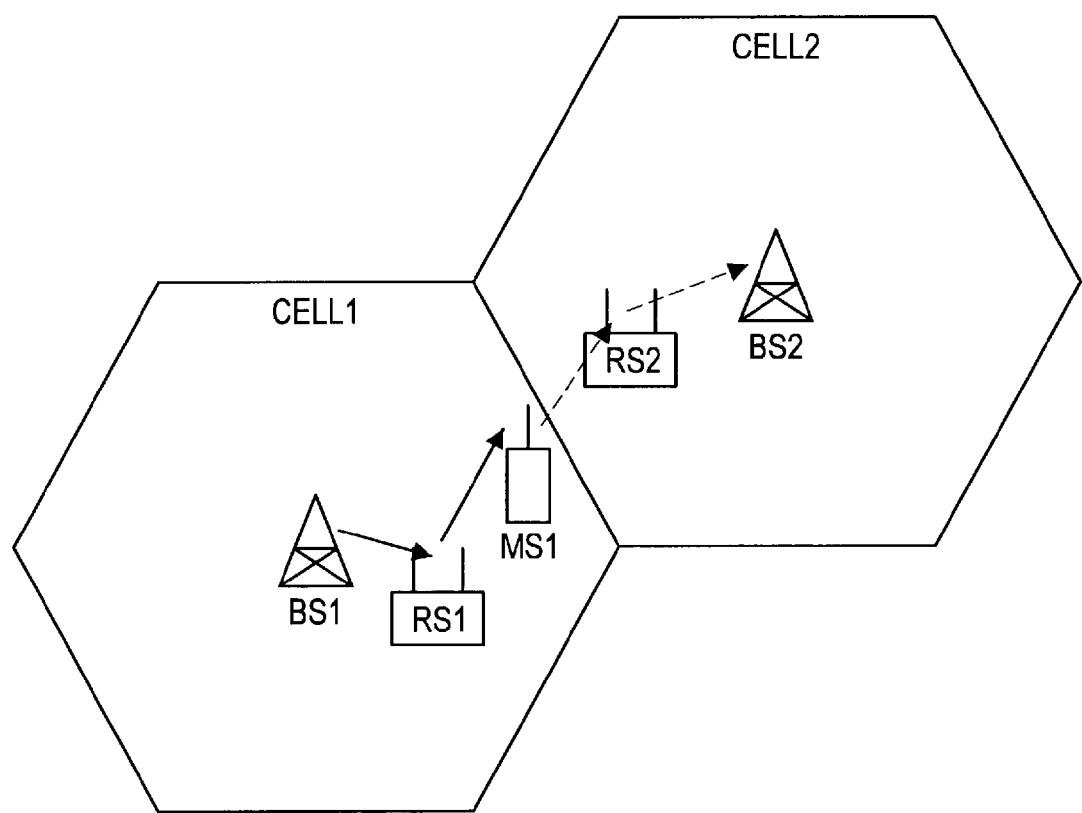
FIG. 5A is a diagram showing how an asymmetric relay is performed between two adjacent cells.
Figure 5B:
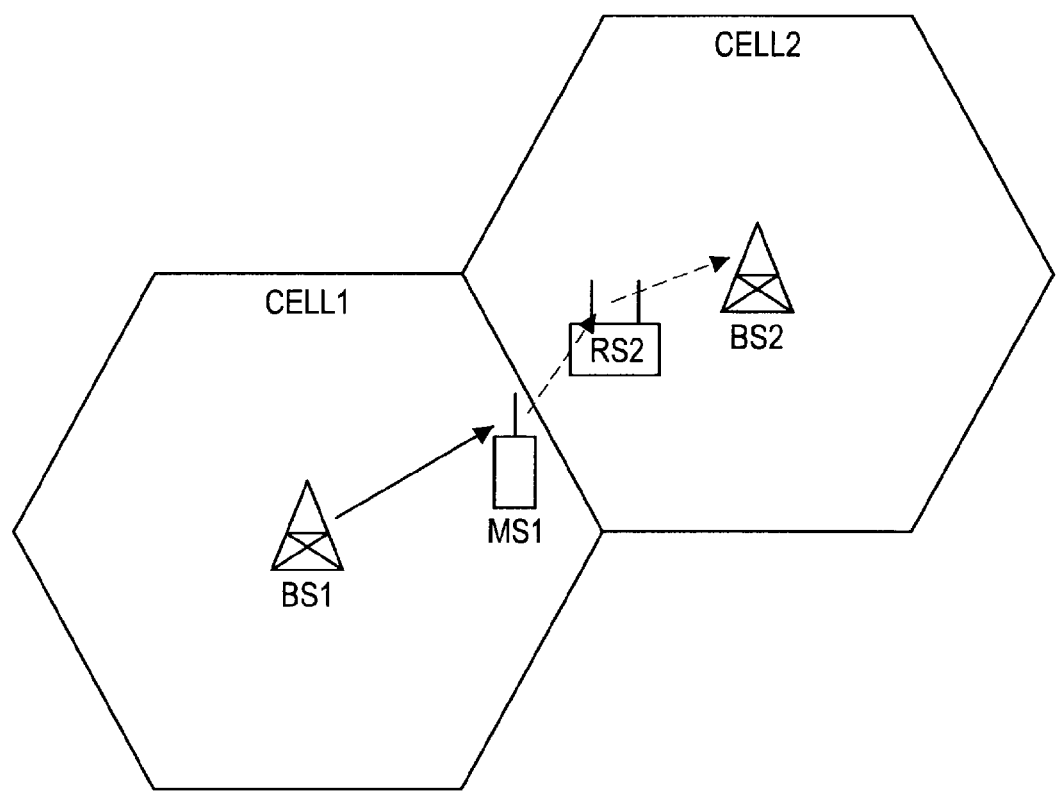
FIG. 5B is a diagram showing how an asymmetric relay is performed between two adjacent cells.

FIG. 5A shows an example of a downlink and an uplink of a mobile station (MS1) passing through two relay stations (RS1, RS2) belonging to a different base station (Cell 1, Cell 2) respectively (an example of the asymmetric relay). Assume, for example, that while there is a vacant slot of a downlink of the base station (BS1) belonging to Cell 1, there is no vacant slot for an uplink. If there is any vacant slot of an uplink of the base station (BS2) of the adjacent Cell 2, the mobile station (MS1) can connect the uplink via the relay station (RS2) belonging to the adjacent Cell 2, instead of the relay station (RS1) belonging to the local cell 1. In FIG. 5A, a downlink for the mobile station (MS1) is denoted as a solid line arrow and an uplink from the mobile station (MS1) as a dashed arrow. It should be noted the mobile station is located in cell 1, but because the wireless resources are unavailable for an uplink to the base station (BS1), the mobile station (MS1) establishes an uplink with the base station (BS2) via the relay node (RS2). FIG. 5B is similar, but excludes the relay station (RS1).

Figure 6A:
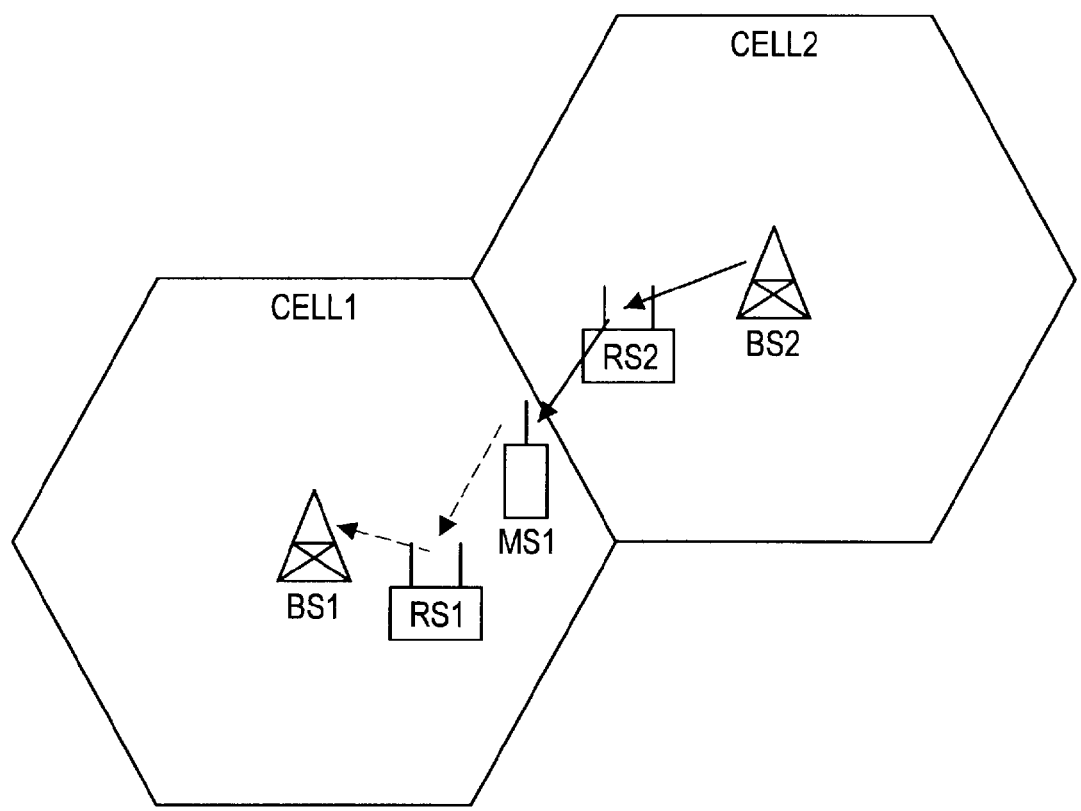
FIG. 6A is a diagram showing how the asymmetric relay is performed between two adjacent cells.
Figure 6B:
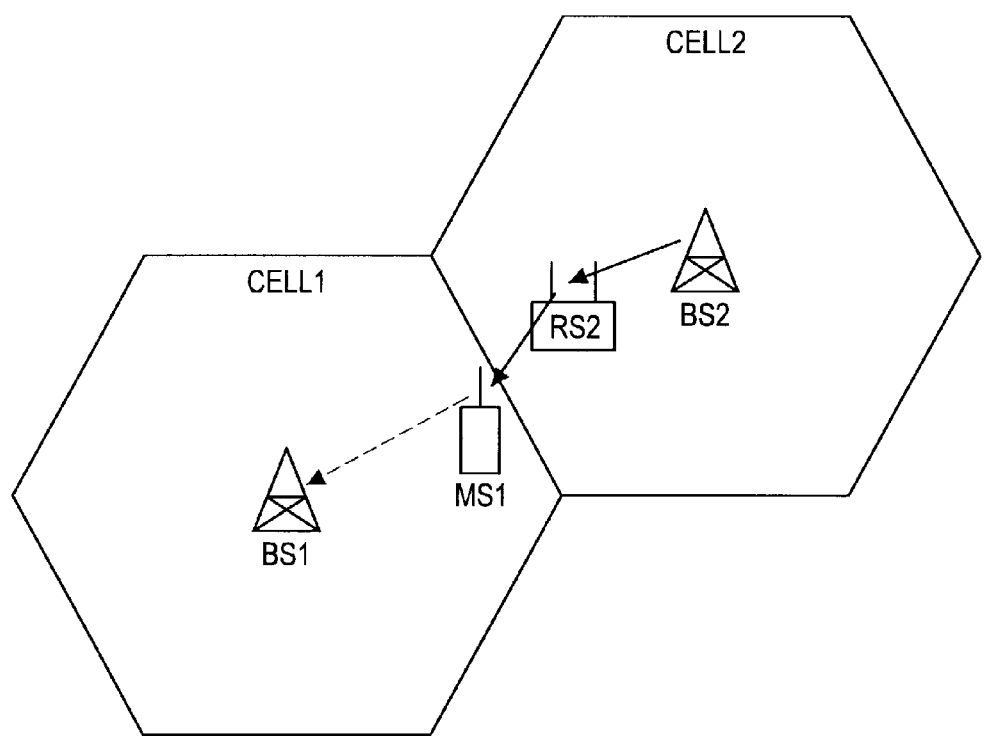
FIG. 6B is a diagram showing how the asymmetric relay is performed between two adjacent cells.

FIG. 6A shows another example of the downlink and the uplink of the mobile station (MS1) passing through the relay station (RS1, RS2) belonging to the different base station (Cell 1, Cell 2) respectively (another example of an asymmetric relay). If, in contrast to the example shown in FIG. 5A, there is a vacant slot of the uplink of the base station (BS1) of Cell 1, but there is no vacant slot for the downlink, the mobile station (MS1) receives the downlink via the relay station (RS2) belonging to the adjacent Cell 2, instead of the relay station (RS1) belonging to the local cell 1. In FIG. 6A, a downlink for the mobile station (MS1) is denoted as a solid line arrow and an uplink from the mobile station (MS1) as a broken line arrow. FIG. 6B is similar, but without the relay station (RS1).

An operation form in which if radio resources of one of a downlink and an uplink of a base station in a cell are depleted, as shown in FIGS. 5A and 6A, a mobile station is connected to the base station of an adjacent cell having sufficient radio resources of the downlink or uplink is difficult to realize in a system in which relay technology is not introduced. This is because it is far away from a mobile station of a local cell to the base station of an adjacent cell without a relay station and it is difficult for a radio wave to reach the base station of an adjacent cell. In contrast, if relay technology is introduced and a relay station is installed in each cell, it becomes easier to establish a link to the base station of an adjacent cell so that an increase in situations in which the asymmetric relay becomes feasible is expected.

A relay station need not be included in all the cells relating to the asymmetric relay, and a relay station in only adjacent cells may be employed as illustrated in FIG. 5B and FIG. 6B. Since a mobile station (MS1) in Cell 1 is distant from a base station (BS2) in an adjacent Cell 2, in order to keep the SNR high, the relay station (RS2) is used to relay the signals (as described above). However, if the SNR is sufficiently high in Cell1, in a direct link between the mobile station (MS1) and the base station (BS1), the relay station (RS1) is not necessary.

As illustrated in FIGS. 5A-B and 6A-B, a mobile station communicates with base stations or relay stations in plurality of different cells is performed using CoMP (Coordination Multiple Point transmission and reception). In this case, it is most natural that the mobile station in a particular cell belongs to the base station for that cell, and other base stations are assisting the first base station. Taking FIG. 5A as an example, two of base stations (BS1, BS2) and two of relay stations (RS1, RS2) recognize an ID of a mobile station (MS1), but the mobile station (MS1) basically belongs to a base station (BS1) in Cell 1 and is not handed-off to another base station. In stead, the base stations coordinate with one another regarding the scheduling of wireless resources for mobile stations and relay nodes, so a more complete utilization of the base station's resources may be realized.

In LTE, radio resources are assigned in resource blocks and scheduling information of an uplink and scheduling information of a downlink are both written into a control channel (L1/L2 control signaling) of the downlink. In contrast, in the case of asymmetric relay, that is, if an uplink and a downlink are connected via the relay station of a different cell, how to deal with scheduling information becomes an issue that will now be dealt with.

Normally, L1/L2 control signaling of a downlink contains scheduling information of an uplink and the downlink as a set (as discussed above and in reference to FIG. 3). In contrast, if, as shown in FIGS. 5A-B and 6A-B, an uplink and a downlink are connected by the asymmetric relay in a different cell, scheduling information contained in the uplink of Cell 1 to which the mobile station (MS1) belongs needs to be transmitted as scheduling information of the uplink of the other Cell 2. However, the mobile station (MS1) transmits an uplink as a mobile station belonging to Cell 1 and thus needs to transmit by conforming to scheduling information of the uplink of Cell 1.

Therefore, scheduling information of an uplink and scheduling information of a downlink are matched between adjacent cells that perform the asymmetric relay.

If, as shown in FIG. 5A, the mobile station (MS1) of Cell 1 that received a downlink via the relay station (RS1) of Cell 1 transmits an uplink to the base station (BS2) of the adjacent Cell 2 passing through the relay station (RS2) of Cell 2, scheduling information of the uplink of the mobile station (MS1) intended for Cell 1 and scheduling information of the uplink for a mobile station (not shown) intended for Cell 2 are matched in L1/L2 control signaling (see FIG. 7).

In the example shown in FIG. 7, a resource block assigned to a target mobile station (A) is specified as scheduling information of a downlink and also a resource block assigned to the target mobile station (A) is specified as scheduling information of an uplink on the Cell 1 side. Similarly on the Cell 2 side, the same resource block is assigned to the target mobile station (A) as scheduling information of an uplink (see gray shaded columns in FIG. 7). However, any assignment is permitted for other resource blocks denoted by "*" in FIG. 7.

Figure 8:
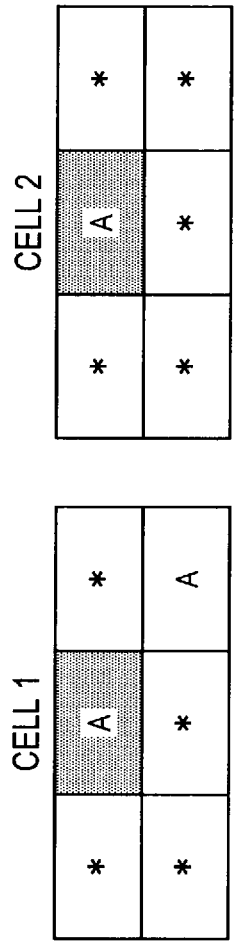
FIG. 8 is a diagram showing the situation in which scheduling information of a downlink is matched between adjacent cells that establish the downlink from the mobile station by the asymmetric relay.

Conversely, if, as shown in FIG. 6A, the mobile station (MS1) of Cell 1 that received a downlink via the relay station (RS2) of the adjacent Cell 2 receives an uplink of Cell 1 from the base station (BS1) of Cell 1 via the relay station (RS1), scheduling information of the downlink of the mobile station (MS1) intended for Cell 1 and scheduling information of the downlink for a mobile station (not shown) intended for Cell 2 are matched in L1/L2 control signaling (see FIG. 8).

In the example shown in FIG. 8, a resource block assigned to the target mobile station (A) is specified as scheduling information of a downlink on the Cell 1 side. Similarly on the Cell 2 side, the same resource block is assigned to the target mobile station (A) as scheduling information of a downlink (see gray shaded columns in FIG. 8). However, any assignment is permitted for other resource blocks denoted by "*" in FIG. 8.

The method of using the frequency of each cell in a communication system conforming to LTE is as described with reference to FIGS. 4A to 4D. In a cell in which relay technology is introduced, a relay station relays to a mobile station apart from a base station (see FIG. 3). The central frequency is used for a relay link between the base station and the relay station and the boundary frequency for an access link between the relay station and the mobile station (if the relay station is installed in the center region and the mobile station in the boundary region). The method of performing the asymmetric relay between adjacent cells in a communication system in which a fractional frequency repetition is applied as intercell interference coordination and relay technology is introduced will be described below.

As a method of matching, between base stations of two adjacent cells performing the asymmetric relay, scheduling information for a specific mobile station of an uplink and a downlink of scheduling information of each of the two cells, a method of reserving an uplink common scheduling region and a downlink common scheduling region between adjacent cells in advance will be cited.

Figure 9:
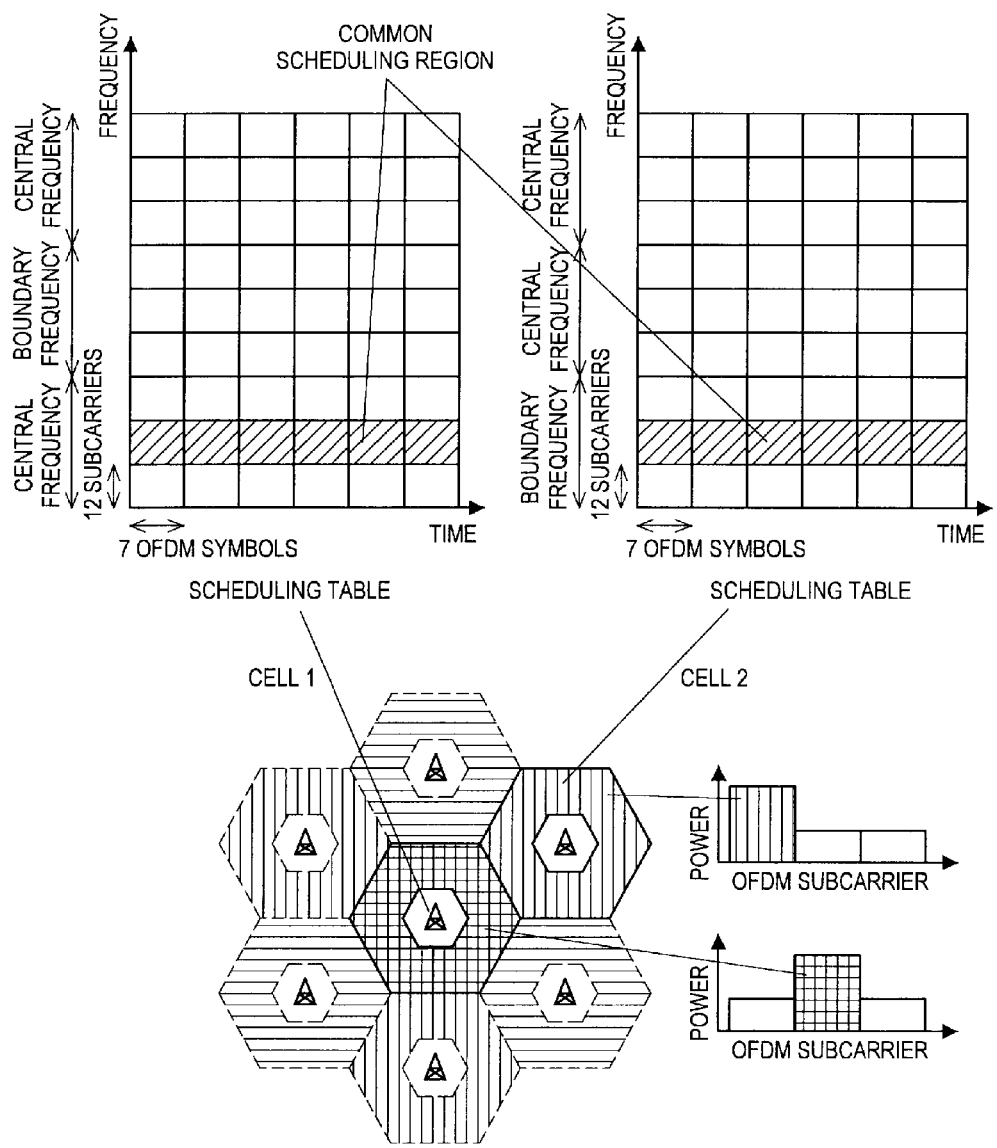
FIG. 9 is a diagram illustrating a scenario of performing the asymmetric relay because there is no vacant time slot of one of the uplink and the downlink in a local cell.

FIG. 9 assumes a scenario in which Cell 1 has no vacant time slot for one of an uplink and a downlink and thus, the asymmetric relay is performed by using the adjacent Cell 2 for the link having no vacant time slot. In the illustrated example, the boundary frequency of Cell 2 is a frequency corresponding to the central frequency of Cell 1. A common scheduling region is reserved in advance in a region corresponding to the central frequency for Cell 1 and the boundary region for Cell 2.

First, a case when an uplink in Cell 1 is connected via a relay station of the adjacent Cell 2 will be described. It is assumed that the base station of Cell 1 has a vacant slot for a downlink, but no vacant slot for an uplink.

In Cell 1, the base station has a vacant slot for a downlink. Thus, the boundary frequency of the local cell is used for transmission to the mobile station via the relay station of the local cell for the downlink (omitted in FIG. 9). Normally, the same boundary frequency as that used for the downlink should be for an uplink for transmission from the mobile station. However, the base station of Cell 1 has no vacant slot for the uplink. Thus, the mobile station of Cell 1 uses the boundary frequency of Cell 2 for transmission via the relay station of the adjacent Cell 2 by means of the asymmetric relay.

A part reserved in advance as the common scheduling region is used for the uplink by means of the asymmetric relay between the adjacent Cell 1 and Cell 2. Scheduling tables of Cell 1 and Cell 2 are shown in the upper part of FIG. 9. The mobile station uses the diagonally shaded part in FIG. 9 for uplink transmission. The uplink is received by the relay station of Cell 2 using the common region. Then, the relay station on the Cell 2 side transmits the uplink to the base station in Cell 2 by using the central frequency of Cell 2.

Subsequently, a case when a downlink in Cell 1 is connected via the relay station of the adjacent Cell 2 will be described. It is assumed that the base station of Cell 1 has a vacant slot for an uplink, but no vacant slot for a downlink.

The relay station of Cell 2 transmits a downlink by using the common scheduling region, which is the boundary frequency for Cell 2, but the central frequency for Cell 1. The mobile station of Cell 1 receives the downlink by means of the asymmetric relay. Then, because there is a vacant slot for an uplink of Cell 1, the mobile station follows a schedule of the uplink by the scheduler of the base station of Cell 1 for transmission to the relay station by using the boundary frequency of Cell 1.

In the example shown in FIG. 9, when an uplink by means of the asymmetric relay is transmitted, the mobile station of Cell 1 uses the central frequency of the local cell 1 as an uplink common scheduling region. The uplink common scheduling region corresponds to the boundary frequency of the adjacent Cell 2 and is a different frequency from the central frequency of Cell 2 and thus causes no interference at cell edges. Conversely, when a downlink by means of the asymmetric relay is transmitted, the relay station of Cell 2 uses a frequency that is the boundary frequency for Cell 2 and the central frequency for Cell 1 as a downlink common scheduling region. The scheduler of the base station of Cell 1 reserves the region as the downlink common scheduling region and thus, there is no interference in Cell 1 even if the region is the central frequency.

In the example shown in FIG. 9, when an uplink is connected by means of the asymmetric relay, the mobile station of Cell 1 uses the common scheduling region assigned to the central frequency of Cell 1 (without using the boundary region of Cell 1 even if located in the boundary region) and thus, this operation differs from a normal uplink which uses the boundary frequency.

Figure 10:
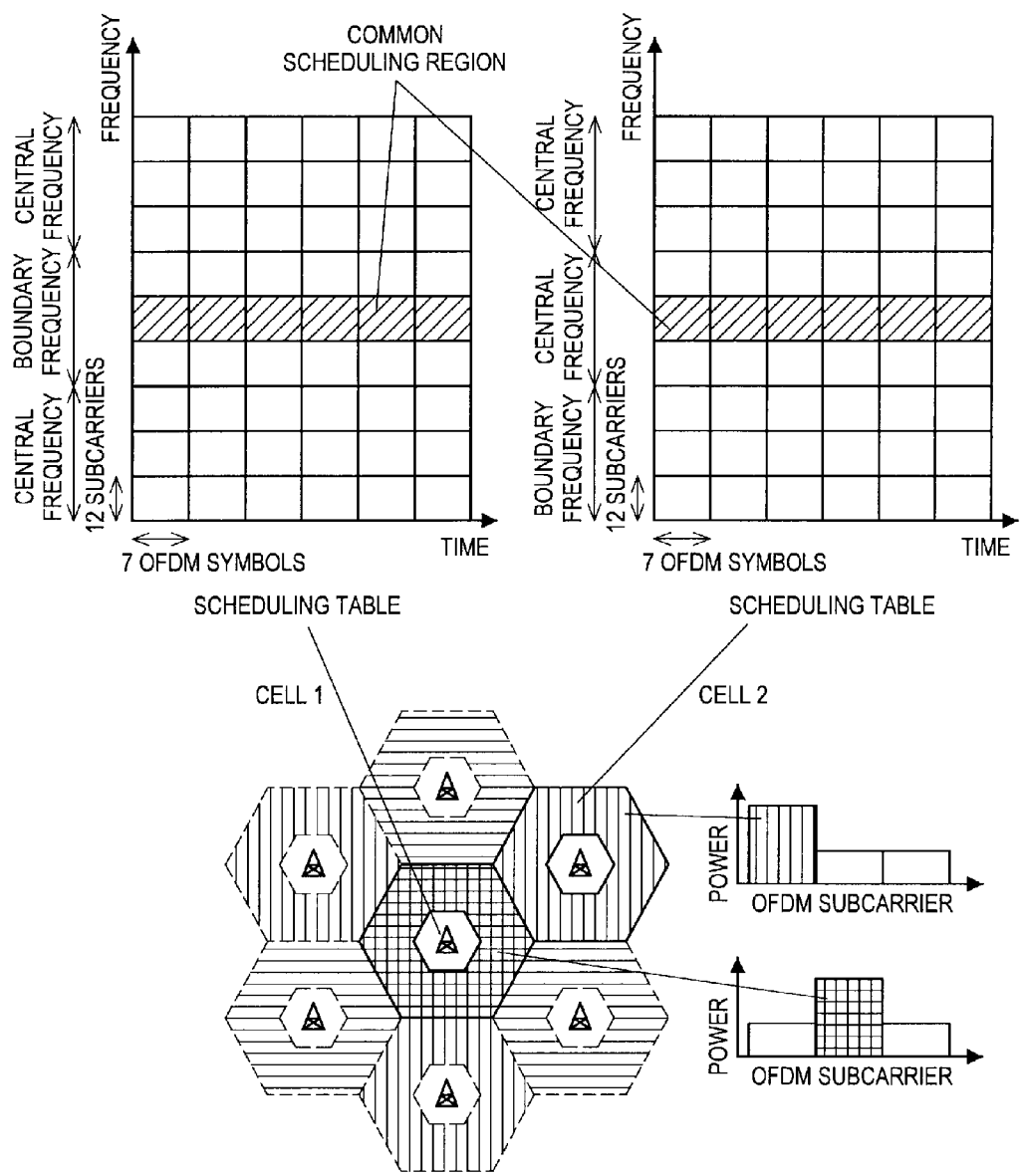
FIG. 10 is a diagram illustrating a scenario of performing the asymmetric relay to improve quality or the like, though there are vacant time slots for scheduling a boundary frequency of the local cell for both the uplink and the downlink.

FIG. 10 assumes a scenario in which though Cell 1 has vacant time slots for scheduling the boundary frequency for both an uplink and a downlink, the asymmetric relay is performed for reasons of better quality or the like when transmitted via the relay station of the adjacent Cell 2.

In the illustrated example, the boundary frequency of Cell 1 is a frequency corresponding to the central frequency of Cell 2. A common scheduling region is reserved in advance for a region corresponding to the boundary frequency for Cell 1 and the central frequency for Cell 2.

Naturally, an uplink should be transmitted from the mobile station by using the boundary frequency of Cell 1. However, communication quality is not good because there is an obstacle between the base station and the mobile station in Cell 1 or the like even if the base station of Cell 1 has a vacant slot for an uplink. Thus, the mobile station uses the central frequency of Cell 2 corresponding to the boundary frequency of Cell 1 for transmission via the relay station of the adjacent Cell 2 by means of the asymmetric relay.

A part reserved in advance as the common scheduling region is used for the uplink by means of the asymmetric relay between the adjacent Cell 1 and Cell 2. Scheduling tables of Cell 1 and Cell 2 are shown in the upper part of FIG. 10. The mobile station uses the diagonally shaded part in FIG. 10 for uplink transmission. The uplink is received by the relay station of Cell 2 using the common region. Then, the relay station on the Cell 2 side transmits the uplink to the base station in Cell 2 by using the central frequency of Cell 2. The relay station of Cell 2 uses a frequency that is the boundary frequency for Cell 1 and the central frequency for Cell 2 as the uplink common scheduling region. The scheduler of the base station of Cell 2 reserves the region as the uplink common scheduling region and thus, there is no interference in Cell 2 even if the region is the central frequency.

Subsequently, a case when a downlink in Cell 1 is connected via the relay station of the adjacent Cell 2 will be described. It is assumed that communication quality is not good because there is an obstacle between the base station and the mobile station in Cell 1 or the like even if there is a vacant slot for a downlink.

The relay station of Cell 2 transmits a downlink by using the common scheduling region, which is the boundary frequency for Cell 1, but the central frequency for Cell 2. The mobile station of Cell 1 receives the downlink by means of the asymmetric relay.

In the example shown in FIG. 10, an access link of the mobile station of Cell 1 uses the same boundary frequency as that of original behavior both for an uplink and a downlink. On the other hand, the relay station of the adjacent Cell 2 is configured to use the central frequency for transmission/reception while originally the boundary frequency is used for an access link to the mobile station.

In the scenario shown in FIG. 9, the mobile station transmits to the relay station in the adjacent cell using a different frequency which is not supposed to be used, while the relay station in the adjacent cell receives using a same frequency which is supposed to be used. On the contrary, in the scenario shown in FIG. 10, the mobile station transmits to the relay station in the adjacent cell using a same frequency which is supposed to be used, while the relay station in the adjacent cell receives using a different frequency which is not supposed to be used.

In FIGS. 9 and 10, other regions than the common scheduling region can be scheduled normally by the scheduler of the base station of each cell without being concerned with scheduling information of other cells. Moreover, when a normal scheduling region is exhausted in each cell, the common scheduling region may be used for normal scheduling.

In the above description with reference to FIGS. 9 and 10, whether the place of the common scheduling region (position in a frequency direction) changes over time is not mentioned. FIG. 11 shows a setting example of the common scheduling region in which positions in a frequency direction do not change over time. In the illustrated example, the third region is shaded with positive slopes in the frequency direction as a first common scheduling region, the second region is shaded with negative slopes as a second common scheduling region, and these regions do not change over time and are used fixedly.

In contrast, even if, as shown in FIG. 12, frequency hopping is allowed for the common scheduling region over time, there arises no issue if a hopping pattern thereof is recognized by base stations of both cells. As illustrated in FIG. 12, the first common scheduling region with positive slope shading and the second common scheduling region with negative slope shading are each hopped in the frequency direction over time. For example, between base stations of two cells collaborating to perform the asymmetric relay, a hopping pattern as shown in FIG. 12 may be notified by using a backhaul or the like so that the hopping pattern is recognized by the base stations. By allowing frequency hopping for the common scheduling region, the degree of interference with the central frequency of the adjacent Cell 2 can be equalized.

Figure 13:
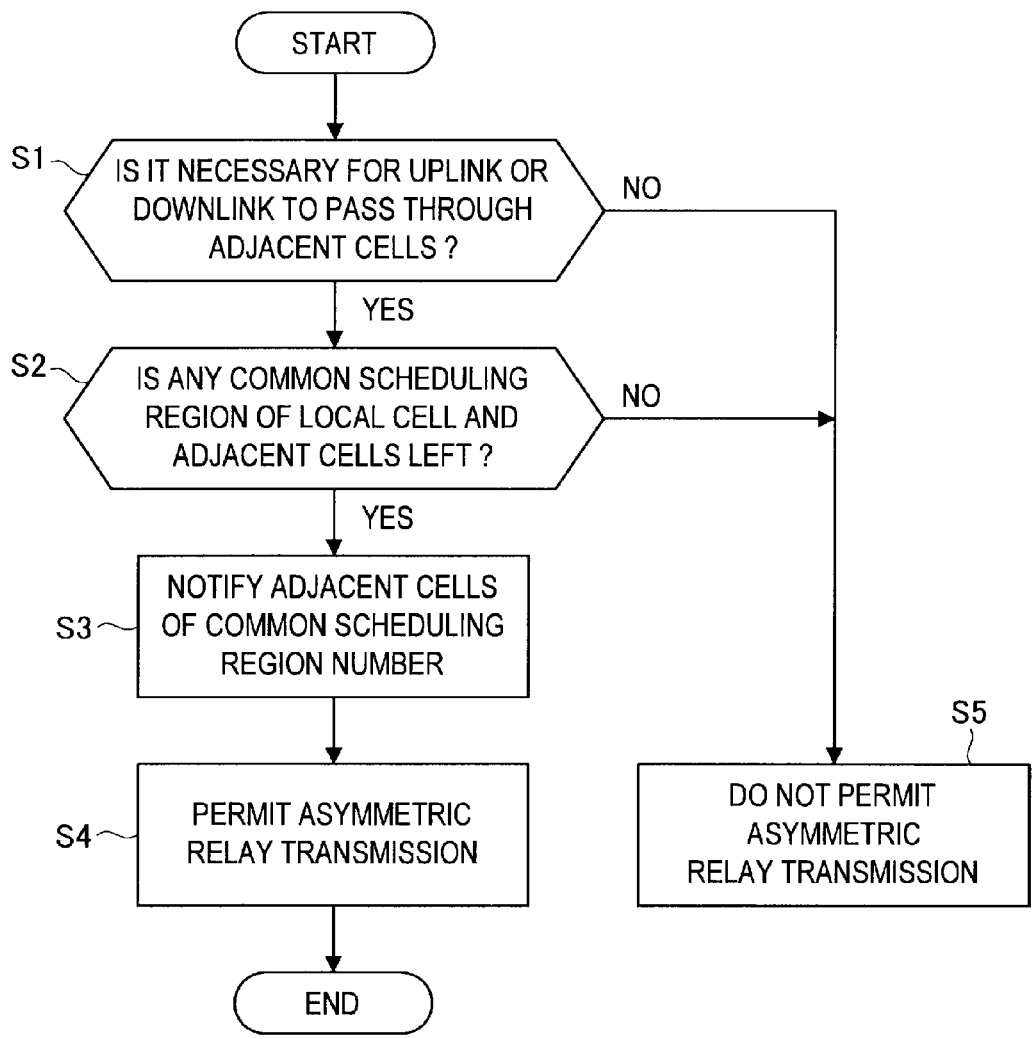
FIG. 13 is a flow chart showing a processing procedure of a base station to perform the asymmetric relay by collaboration between adjacent cells according to the scenario shown in FIG. 9 or 10.

FIG. 13 shows a processing procedure of a base station to perform the asymmetric relay by collaboration between adjacent cells according to the scenario shown in FIG. 9 or 10 in the form of a flow chart. It is assumed, however, that a predetermined common scheduling region is reserved in advance between adjacent cells through a backhaul or the like.

First, the base station checks whether it is necessary to pass through an adjacent cell, that is, to perform the asymmetric relay for an uplink or a downlink with a specific mobile station (step S1).

An example when it is necessary to perform the asymmetric relay is when there is no vacant time slot for one of the uplink and downlink in the local cell (see FIG. 9). Another example thereof is when there are vacant time slots for scheduling the boundary frequency of the local cell for both the uplink and downlink, but communication quality is better if communication passes through an adjacent cell (see FIG. 10).

If a judgment is made that it is not necessary to perform the asymmetric relay (No in step S1), the base station does not permit the asymmetric relay for a downlink or an uplink with the mobile station (step S5). In this case, the base station performs a normal relay operation in the cell by performing scheduling for the relay station installed in the local cell.

If, on the other hand, a judgment is made that it is necessary to perform the asymmetric relay (Yes in step S1), the base station further checks whether the common scheduling region between the local cell and the adjacent cell still remains (step S2).

If the common scheduling region between the local cell and the adjacent cell no longer remains (No in step S2), it is difficult to perform the asymmetric relay using the adjacent cell and thus, the base station does not permit the asymmetric relay for a downlink and an uplink with the mobile station (step S5). In this case, the base station performs a normal relay operation in the cell by performing scheduling for the relay station installed in the local cell.

In contrast, if the common scheduling region between the local cell and the adjacent cell still remains (Yes in step S2), the base station decides a portion to be used for the asymmetric relay from the unused common scheduling region and notifies the base station of the adjacent cell of the identification number thereof through a backhaul (step S4) and also permits the asymmetric relay for a downlink and an uplink with the mobile station (step S4).

Figure 14:
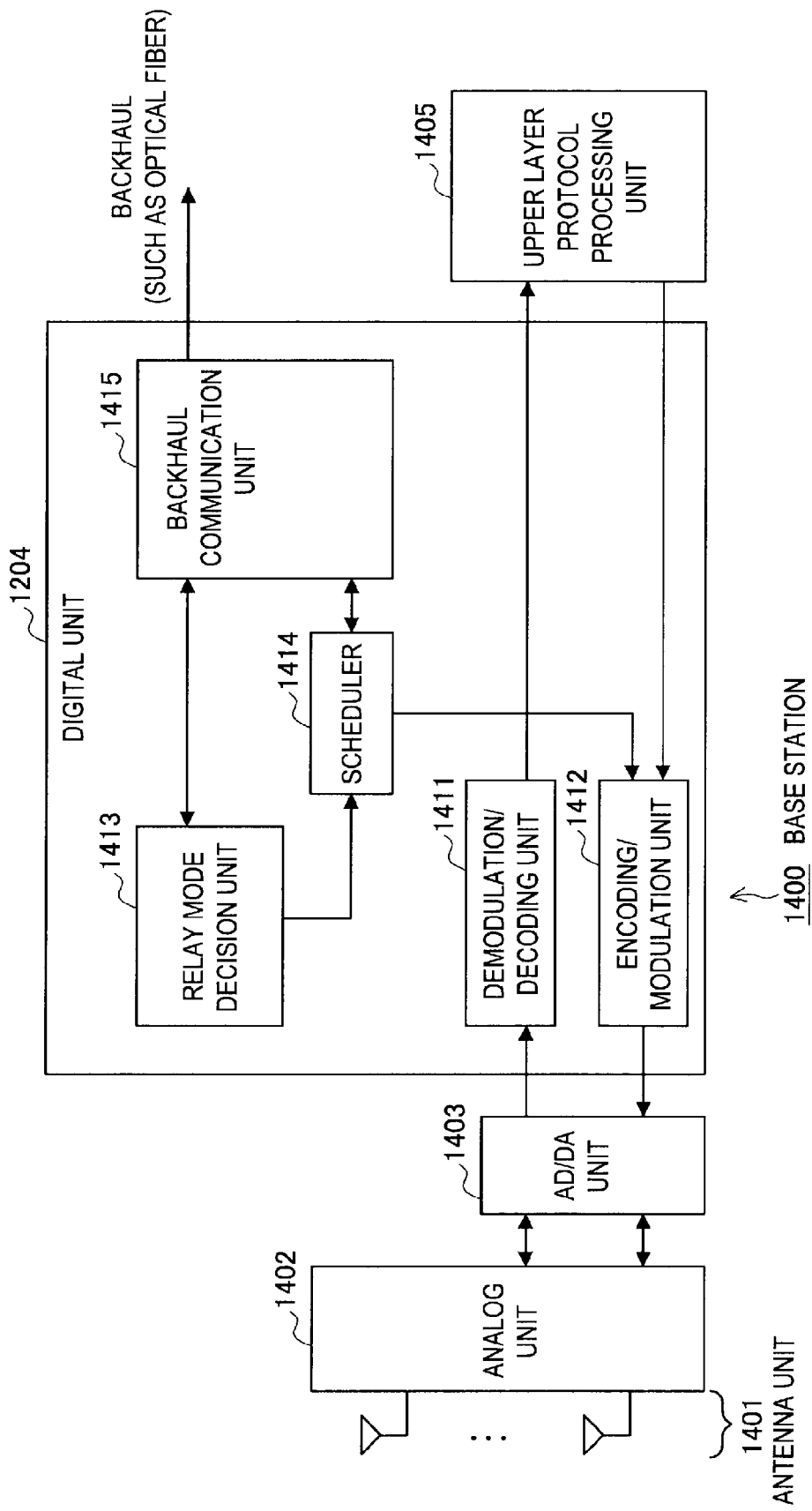
FIG. 14 is a diagram schematically showing a functional configuration for the base station operating in a cellular system according to an embodiment of the present invention to realize the asymmetric relay.

FIG. 14 schematically shows the functional configuration for the base station operating in a cellular system according to the present embodiment to realize the asymmetric relay according to the processing procedure shown in FIG. 13. An illustrated base station 1400 is constituted by an antenna unit 1401, an analog unit 1402 that performs analog processing of a transmission/reception signal, an AD/DA processing unit 1403 that performs digital conversion of an analog reception signal or analog conversion of a digital transmission signal, a digital unit 1404 that performs digital processing of a transmission/reception signal, and an upper layer protocol processing unit 1405 that performs a data transmission request, reception data processing and the like.

The base station 1400 has, for example, a plurality of antenna elements as the antenna unit 1401 and adopts the space division multiple access scheme in which radio resources on spatial axes are shared by a plurality of users like multi-user MU-MIMO or SDMA to realize high-throughput communication, which is not, however, directly related to the gist of the present invention and thus is herein omitted.

The upper layer protocol processing unit 1405 can also be constituted as a general computer system such as a personal computer, which is not, however, directly related to the gist of the present invention and thus is herein omitted.

The digital unit 1404 includes, in addition to a demodulation/decoding unit 1411 that performs demodulation and decoding processing of a reception signal and an encoding/modulation unit 1412 that performs encoding and modulation processing of a transmission signal, functional modules such as a relay mode decision unit 1413 that makes a decision about a relay mode for an uplink and a downlink to the mobile station in the local cell, and a relay mode for an uplink and a downlink to the mobile station in the adjacent cell, a scheduler 1414 that manages, that is, schedules radio resources in the local cell, and a backhaul communication unit 1415 that performs communication with base stations of other cells through a backhaul constituted by optical fibers or the like. The functional modules 1413 and 1414 can be constituted by dedicated hardware, but can also be realized by a predetermined software program being executed by a processor.

The relay mode decision unit 1413 makes a decision about a relay mode according to the processing procedure illustrated in FIG. 13 when performing an uplink or a downlink transmission to a specific mobile station. In other words, when in the uplink or downlink transmission to the mobile station in the local cell, the relay mode decision unit 1413 decides whether an asymmetric relay via a relay station is necessary according to a vacant status of radio resources in the local cell and a vacant status of the common scheduling region common with an adjacent cell. If the asymmetric relay is decided to be performed, the relay mode decision unit 1413 notifies an identification number of the common scheduling region to be used to the base station of the adjacent cell through a backhaul.

Further, the relay mode decision unit 1413 notifies an instruction regarding the asymmetric relay to the corresponding relay station in the local cell when received a notification of asymmetric relay through the relay station in the local cell for the uplink and downlink to the mobile station in the adjacent cell, together with the identification number of the common scheduling region to be used.

The relay mode decision unit 1413 may allow frequency hopping over time for the common scheduling region which is used for an asymmetric relay. By allowing frequency hopping, the degree of interference with the central frequency of the adjacent cells can be equalized.

The scheduler 1414 assigns, that is, schedules radio resources in the local cell according to content decided by the relay mode decision unit 1413. The minimum unit of scheduling is the resource block.

Figure 15:
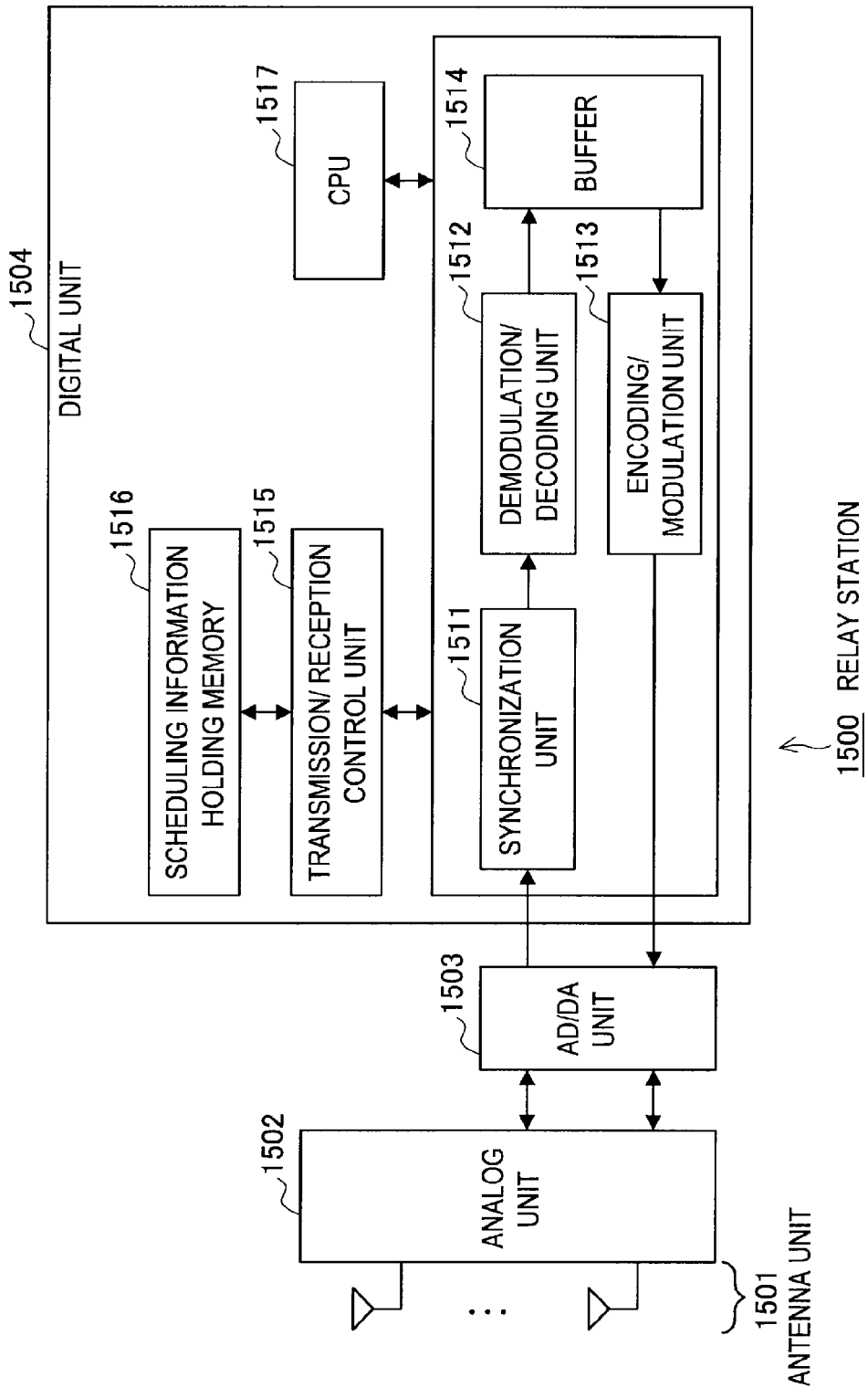
FIG. 15 is a diagram schematically showing the functional configuration for the relay station to operate in the cell performing the asymmetric relay in the cellular system according to an embodiment of the present invention.

FIG. 15 schematically shows the functional configuration of the relay station operating in the cellular system according to the present embodiment. An illustrated relay station 1500 is constituted by an antenna unit 1501, an analog unit 1502 that performs analog processing of a transmission/reception signal, an AD/DA processing unit 1503 that performs digital conversion of an analog reception signal or analog conversion of a digital transmission signal, and a digital unit 1504 that performs digital processing of a transmission/reception signal.

The relay station 1500 has, for example, a plurality of antenna elements as the antenna unit 1501 and may adopt the space division multiple access scheme (same as above), but the gist of the present invention is not limited to this.

The digital unit 1504 is constituted by a transmission/reception control unit 1515 that controls operations of transmission/reception units, a scheduling information holding memory 1516 that stores scheduling information transmitted from the base station 1400 through the control channel, and a CPU (Central Processing Unit) 1517 that controls operations inside the digital unit 1504 in a unifying fashion. The transmission/reception units are constituted by a synchronization unit 1511 that acquires synchronization from digital reception signals, a demodulation/decoding unit 1512 that performs demodulation and decoding processing of a reception signal according to the acquired synchronization, a buffer 1514 that temporarily holds transmission data, and an encoding/modulation unit 1513 that performs encoding and modulation processing of a transmission signal.

The transmission/reception control unit 1515 controls reception processing in a relay link and transmission processing in an access link of a downlink and also reception processing in an access link and transmission processing in a relay link of an uplink using specified resource blocks according to scheduling information stored in the scheduling information holding memory 1516.

The buffer 1514 has data received in a relay link of a downlink and addressed to a mobile station 1600 (described later) or data received in an access link of an uplink and addressed to the base station 1400 stored temporarily therein and transmits the data to the mobile station 1600 as an access link of the downlink or to the base station 1400 as a relay link of the uplink. The relay station 1500 temporarily holds a signal to be relayed in the buffer 1514 after demodulating and decoding the signal and then encodes and modulates the signal again for transmission. That is, the DF mode (mentioned above) is applied, but AF mode may also be applied.

Note that the processing procedure illustrated in FIG. 13 is to be executed by the base station to determine the relay mode of the relay station in the local cell, and the configuration example of the base station 1400 illustrated in FIG. 14 and the configuration example of the relay station illustrated in FIG. 15 are premised on that the base station 1400 determines the relay mode by the relay station 1500 in the local cell. As its alternative example, there may be a configuration where the relay station 1500 includes the relay mode decision unit (that has same functions as the relay mode decision unit 1413 of the base station 1400) and determines the relay mode. In this case, the relay station 1500 is to be notified information which is necessary to determine the relay mode from the base station in a cell, or to collect the information by itself. Moreover, the processing to determine the relay mode can be dispersed on more than two different devices (for example, a base station and a relay station), considering differences between the access link and the relay link, or differences between the uplink and the downlink.

Figure 16:
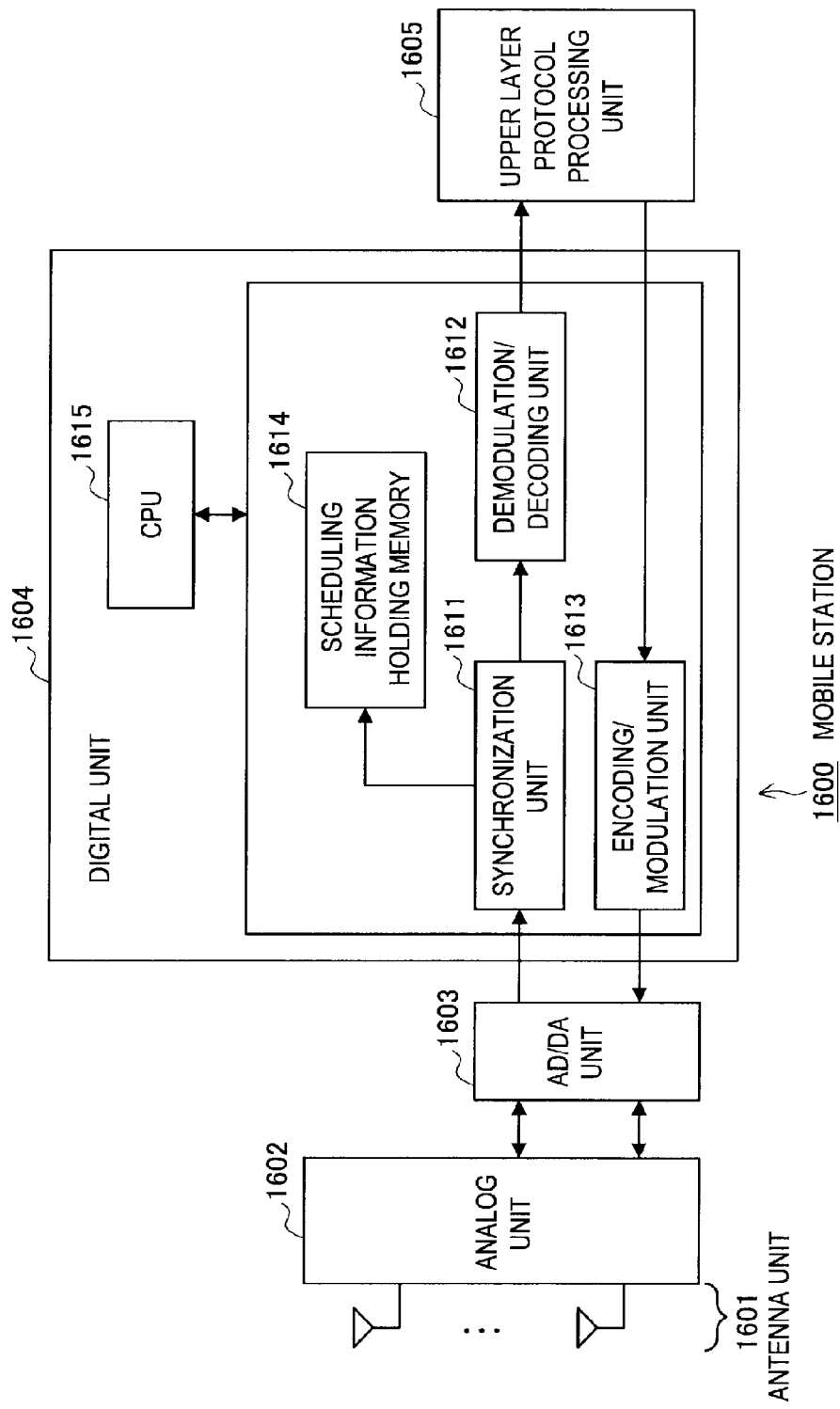
FIG. 16 is a diagram schematically showing the functional configuration for the mobile station to operate in the cell performing the asymmetric relay in the cellular system according to an embodiment of the present invention.

FIG. 16 schematically shows the functional configuration for the mobile station operating in a cellular system according to the present embodiment. An illustrated mobile station 1600 is constituted by an antenna unit 1601, an analog unit 1602 that performs analog processing of a transmission/reception signal, an AD/DA processing unit 1603 that performs digital conversion of an analog reception signal or analog conversion of a digital transmission signal, a digital unit 1604 that performs digital processing of a transmission/reception signal, and an upper layer protocol processing unit 1605 that performs a data transmission request, reception data processing and the like.

The mobile station 1600 has, for example, a plurality of antenna elements as the antenna unit 1601 and may adopt the space division multiple access scheme (same as above), but the gist of the present invention is not limited to this. The upper layer protocol processing unit 1605 can also be constituted as a general computer system such as a personal computer (same as above).

The digital unit 1604 is constituted by a synchronization unit 1611 that acquires synchronization from digital reception signals, a demodulation/decoding unit 1612 that performs demodulation and decoding processing of a reception signal according to the acquired synchronization, an encoding/modulation unit 1613 that performs encoding and modulation processing of a transmission signal, a scheduling information holding memory 1614 that stores scheduling information transmitted from the base station 1400 through the control channel, and a CPU 1615 that controls operations inside the digital unit 1404 in a unifying fashion.

The scheduling information holding memory 1614 has resource blocks assigned to the local station stored therein as scheduling information. The synchronization unit 1611 and the demodulation/decoding unit 1612 perform reception processing by using resource blocks assigned for an access link of a downlink. The encoding/modulation unit 1613 performs a transmission operation by using resource blocks assigned for an access link of an uplink.

It should be understood that, between the adjacent cells arranged the base station 1400, the relay station 1400 and the mobile station 1600 as respectively illustrated in FIG. 14, FIG. 15 and FIG. 16, when reserving the bandwidth of traffic for relay in common between the adjacent cells and realizing the asymmetric relay, assigning the frequency band in accordance with the location of the relay station can eliminate the asymmetry of radio resources assigned to the downlink and uplink in the cell, improve the efficiency of frequency utilization, and improve throughput for the user as well.

Figure 17:
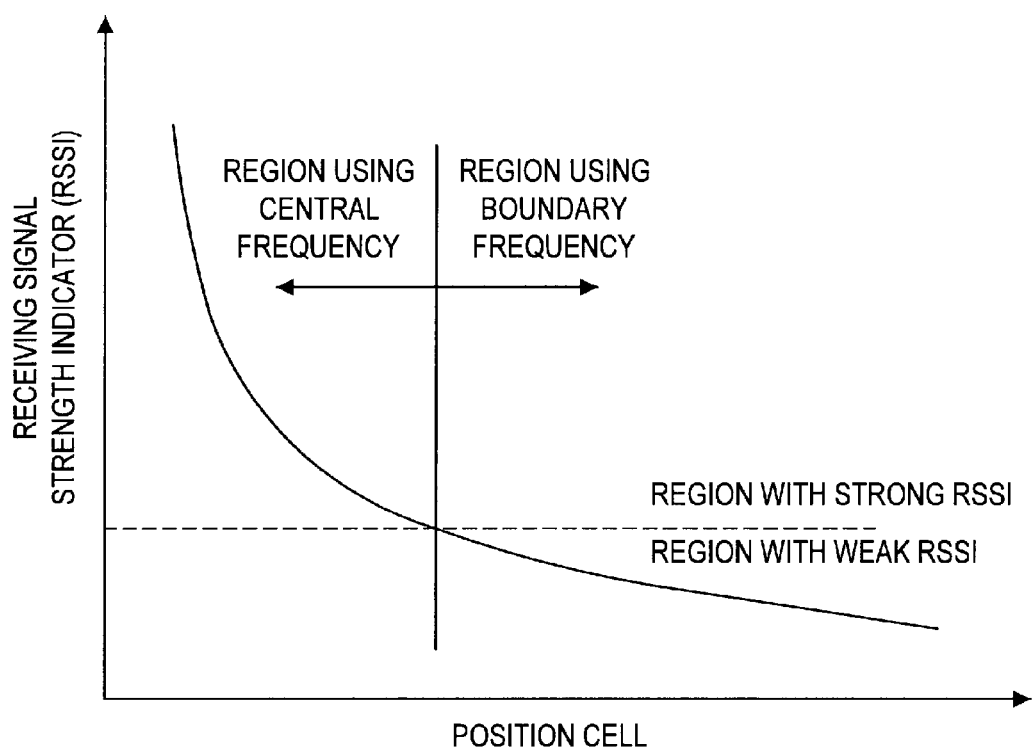
FIG. 17 is a diagram showing a relationship between a receiving signal strength and a communication range from the base station (positions of a relay station and a mobile station in a cell).

How to obtain positions of the relay station and the mobile station will now be explained. For example, the base station measures each communication range to the relay station and the mobile station based on the receiving signal strength indicator (RSSI) from the relay station and the mobile station, and based on the result, the base station can detect positions of the relay station and the mobile station. When receiving a radio signal from the relay station and the mobile station, the base station may obtain the receiving signal strength from each of the stations. FIG. 17 shows a relationship between the receiving signal strength and the communication range from the base station (positions of the relay station and the mobile station in a cell). As shown, the more distant the relay station and the mobile station are located from the base station, the more the receiving signal strength weakens. It can be estimated that a position where the receiving signal strength is stronger than the predetermined threshold is a central region, a position where the receiving signal strength is weaker, but still perceivable, than the predetermined threshold is a boundary region. Further, the base station may determine which to use, either the central region or the boundary region, for each of the relay link and the access link based on the estimated result of the positions of the relay station and the mobile station.

Moreover, as another method how the base station obtains information on the position of the relay station and the mobile station, there may be a method to inform the base station of information on a position measured by GPS using a channel of an uplink while the relay station and the mobile station mounts a GPS (Global Positioning System) respectively. The base station may determine which to use, either the central frequency or the boundary frequency, for each of the relay link and the access link based on information on the position notified by the relay station and the mobile station.

Moreover, as yet another method how the base station obtains information on the position of the relay station and the mobile station, there may be a method to utilize an initialization procedure used when the relay station and the mobile station access a network. As one of the initialization procedures to access the network, a random access is to be performed. At a time of random access, the base station can obtain information on how long a delay of a signal transmitted from the relay station and the mobile station is (timing advanced value). Since the delay is large if the communication range is long, and the delay is small if the communication range is short, the base station can estimate the positions of the relay station and the mobile station based on the timing advanced value. Thus, as the estimation result, the base station may determine which to use, either the central frequency or the boundary frequency fro each of the relay link and the access link.

INDUSTRIAL APPLICABILITY

In the foregoing, the present invention has been described in detail with reference to specific embodiments. However, it is self-evident that persons skilled in the art can modify or replace such embodiments without deviating from the gist of the present invention.

Herein, the description has focused on embodiments obtained by applying the present invention to a mobile communication system, but the gist of the present invention is not limited to this. The present invention can similarly be applied to various communication systems including wireless LANs in which a base station and a mobile station communicate through the mediation of a relay station.

In summary, the present invention has been disclosed in the form of exemplification and content described herein should not be interpreted restrictively.

REFERENCE SIGNS LIST

1400 Base station
1401 Antenna unit
1402 Analog unit
1403 AD/DA processing unit
1404 Digital unit
1405 Upper layer protocol processing unit
1411 Demodulation/decoding unit
1412 Encoding/modulation unit
1413 Relay mode decision unit
1414 Scheduler
1415 Backhaul communication unit
1500 Relay station
1501 Antenna unit
1502 Analog unit
1503 AD/DA processing unit
1504 Digital unit
1511 Synchronization unit
1512 Demodulation/decoding unit
1513 Encoding/modulation unit
1514 Buffer
1515 Transmission/reception control unit
1516 Scheduling information holding memory
1517 CPU
1600 Mobile station
1601 Antenna unit
1602 Analog unit
1603 AD/DA processing unit
1604 Digital unit
1605 Upper layer protocol processing unit
1611 Synchronization unit
1612 Demodulation/decoding unit
1613 Encoding/modulation unit
1614 Scheduling information holding memory
1615 CPU

The invention claimed is:

1. A mobile communication system comprising:
a first base station that services a first coverage area and establishes a first link with a mobile station within said first coverage area, said first link being one of an uplink and a downlink; and
a second base station that services a second coverage area and establishes a second link with said mobile station via a relay node within said second coverage area, said second link being an other of said uplink and said downlink, wherein
said first base station determines whether a communication quality of said first link between said mobile station and said first base station is below a predetermined level,
said first base station transmits a first instruction to said mobile station when said communication quality of said first link is below said predetermined level and said first link is an uplink, said first instruction to disconnect said first link with first said base station, establish an uplink with said second base station and maintain said second link with said second base station, said second link being a downlink, and
said first base station transmits a second instruction to said mobile station when said communication quality of said first link is below said predetermined level and said first link is a downlink, said second instruction to disconnect said first link with said first base station, establish a downlink with said second base station and maintain said second link with said second base station, said second link being an uplink.

2. The mobile communication system of claim 1, wherein said first coverage area includes
an inner region where wireless resources are dedicated for use by said first base station, and
an outer region where said wireless resources are shared by said first base station and said second base station.

3. The mobile communication system of claim 1, wherein said mobile station communicates with said first base station via said first link and communicates with said second base station via said second link by using Coordination Multiple Point transmission and reception (CoMP).

4. The mobile communication system of claim 1, wherein
said first base station adjusts said predetermined level to account for a communication quality of said second link between said mobile station and said second base station, and
said first base station maintains said first link when the communication quality of said second link is lower than said communication quality of said first link and said communication quality of said first link is equal to or greater than said predetermined level.

5. The mobile communication system of claim 1, wherein said first base station schedules wireless resources, said wireless resources including intercell interference coordination using fractional frequency repetition that combines one-cell frequency repetition and multi-cell frequency repetition.

6. The mobile communication system of claim 1, wherein
said first base station determines a relative location of said mobile station according to at least one of signal strength, GPS reception and signal delay, and
said first base station and said second base station coordinate scheduling of wireless resources for a mobile station located in said first coverage area.

7. A mobile station for use in a wireless communications system having a first base station that services a first coverage area and a second base station that services a second coverage area, said mobile station comprising:

a controller;
a scheduling information storage device that is accessible to said controller and stores information including a scheduling table indicating wireless resources for communication with the first base station and the second base station; and
a transmitter, wherein
when said mobile station is within said first coverage area, said controller controls said transmitter to establish a first link with said first base station, said first link being one of an uplink and a downlink, and establish a second link with said second base station via a relay node within said second coverage area, said second link being an other of said uplink and said downlink,
when a communication quality of said first link is below a predetermined level and when said first link is an uplink, said transmitter receives a first instruction from said first base station, the first instruction to disconnect said first link from said first base station, establish an uplink with said second base station and maintain said second link with said second base station, said second link being a downlink, and
when a communication quality of said first link is below a predetermined level and said second link is a downlink, said transmitter receives a second instruction from said first base station, the second instruction to disconnect said first link from said first base station, establish a downlink with said second base station and maintain said second link with said second base station, said second link being an uplink.

8. The mobile station of claim 7, wherein the first coverage area includes
an inner region where said wireless resources are dedicated for use by said first base station, and
an outer region where said wireless resources are shared between said first base station and said second base station, wherein
said mobile station includes a GPS receiver that informs said first base station of a position of said mobile station.

9. The mobile station of claim 7, wherein said mobile station communicates with said first base station via said first link and communicates with said second base station via said second link by using Coordination Multiple Point transmission and reception (CoMP).

10. The mobile station of claim 7, wherein said controller maintains said first link with said first base station when said communication quality of said second link is lower than said communication quality of said first link and said communication quality of said first link equal to or greater than said predetermined level.

11. The mobile station of claim 7, wherein said information in the scheduling information storage device includes scheduling information based on fractional frequency repetition that combines one-cell frequency repetition and multi-cell frequency repetition.

12. A base station for a wireless mobile communication system, said base station comprising:
a transmitter that provides wireless coverage over a first coverage area and establishes a link with a mobile station within said first coverage area, said link being one of an uplink and a downlink, and said first coverage area abutting a second coverage area provided by a second base station; and
a relay mode decision circuit that
determines, when said mobile station is within said first coverage area, whether a communication quality of said link between said mobile station and said base station is below said predetermined level,
controls the transmitter to transmit a first instruction to said mobile station when said communication quality of said link is below said predetermined level and said link is an uplink, said first instruction to disconnect said link with said base station, establish an uplink with said second base station and maintain a second link between said mobile station and said second base station, said second link being a downlink, and
controls the transmitter to transmit a second instruction to said mobile station when said communication quality of said first link is below said predetermined level and said first link is a downlink, said first instruction to disconnect said first link with said base station, establish a downlink with said second base station and maintain said second link between said mobile station and said second base station, said second link being an uplink.

13. The base station of claim 12, wherein said first coverage area includes
an inner region where wireless resources are dedicated for use by said base station, and
an outer region where said wireless resources are shared between said base station and said second base station.

14. The base station of claim 12, wherein said mobile station communicates with said base station via said link and communicates with said second base station via said second link by using Coordination Multiple Point transmission and reception (CoMP).

15. The base station of claim 12, wherein said relay mode decision circuit adjusts said predetermined level to account for a communication quality of said second link between said mobile station and said second base station, and
said transmitter maintains said link when the communication quality of said second link is lower than said communication quality of said link and said communication quality of said link is equal to or greater than said predetermined level.

16. The base station of claim 15, wherein said relay mode decision circuit determines a relative location of said mobile station according to at least one of signal strength, GPS reception and signal delay, and
said relay mode decision circuit controls said transmitter to coordinate scheduling of wireless resources for the mobile station in said first coverage area with the second base station.

17. A method for conducting wireless communications in a mobile communication system, comprising:
establishing, by a first base station that services a first coverage area, a first link with a mobile station within said first coverage area, said first link being one of an uplink and a downlink;
establishing, by a second base station that services a second coverage area, a second link with said mobile station via a relay node within said second coverage area, said second link being an other of said uplink and said downlink;
determining, by said first base station, whether a communication quality of the first link is below a predetermined threshold;
transmitting, by said first base station, a first instruction to said mobile station when said communication quality of said first link is below said predetermined level and said first link is an uplink, said first instruction to disconnect said first link with first said base station, establish an uplink with said second base station and maintain said second link with said second base station, said second link being a downlink; and transmitting, by said first base station, a second instruction to said mobile station when said communication quality of said first link is below said predetermined level and said first link is a downlink, said second instruction to disconnect said first link with said first base station, establish a downlink with said second base station and maintain said second link with said second base station, said second link being an uplink.

18. The communication method of claim 17, wherein Coordination Multiple Point transmission and reception (CoMP) is used to establish the second link with the mobile station.

19. The communication method of claim 17, wherein said first coverage area includes
    an inner region where wireless resources are dedicated for use by said first base station, and
    an outer region where said wireless resources are shared by said first base station and said second base station.

20. The communication method of claim 17, further comprising:
    adjusting, by said first base station, said predetermined level to account for a communication quality of said second link between said mobile station and said second base station; and
    maintaining, by said first base station, said first link when the communication quality of said second link is lower than said communication quality of said first link and said communication quality of said first link is equal to or greater than said predetermined level.

* * * * *